United States Patent
Tahara et al.

(10) Patent No.: US 11,483,528 B2
(45) Date of Patent: Oct. 25, 2022

(54) INFORMATION PROCESSING APPARATUS AND INFORMATION PROCESSING METHOD

(71) Applicant: SONY CORPORATION, Tokyo (JP)

(72) Inventors: Tomu Tahara, Tokyo (JP); Naoki Kobayashi, Tokyo (JP); Yugo Katsuki, Tokyo (JP)

(73) Assignee: SONY CORPORATION, Tokyo (JP)

(*) Notice: Subject to any disclaimer, the term of this patent is extended or adjusted under 35 U.S.C. 154(b) by 156 days.

(21) Appl. No.: 16/964,818

(22) PCT Filed: Jan. 25, 2019

(86) PCT No.: PCT/JP2019/002389
§ 371 (c)(1),
(2) Date: Jul. 24, 2020

(87) PCT Pub. No.: WO2019/155903
PCT Pub. Date: Aug. 15, 2019

(65) Prior Publication Data
US 2021/0067753 A1    Mar. 4, 2021

(30) Foreign Application Priority Data
Feb. 8, 2018 (JP) .............................. JP2018-020612

(51) Int. Cl.
*H04N 9/31* (2006.01)
*G03B 21/14* (2006.01)

(52) U.S. Cl.
CPC ......... *H04N 9/3185* (2013.01); *G03B 21/145* (2013.01); *G03B 21/147* (2013.01); *H04N 9/3191* (2013.01)

(58) Field of Classification Search
CPC ...... H04N 9/31; H04N 9/3185; H04N 9/3191; G03B 21/14; G03B 21/147; G03B 21/145
(Continued)

(56) References Cited

U.S. PATENT DOCUMENTS 8,482,595 B2 * 7/2013 Kweon .............. H04N 5/23299
348/37
10,176,595 B2 * 1/2019 Lee ...................... H04N 5/3572
(Continued)

FOREIGN PATENT DOCUMENTS

JP    2001-320652 A    11/2001
JP    2004-015255 A    1/2004
(Continued)

OTHER PUBLICATIONS

International Search Report and Written Opinion of PCT Application No. PCT/JP2019/002389, dated Apr. 16, 2019, 11 pages of ISRWO.

Primary Examiner — William C. Dowling
(74) Attorney, Agent, or Firm — Chip Law Group

(57) ABSTRACT

The present disclosure relates to an information processing apparatus and an information processing method for suppressing a decrease in the accuracy of image projection correction. By use of an image projection model using a distortion factor of an fθ lens with an image height of incident light expressed by the product of a focal point distance f and an incident angle θ of the incident light, the posture of a projection section for projecting an image and the posture of an imaging section for capturing a projection plane to which the image is projected are estimated. The present disclosure may be applied, for example, to information processing apparatuses, projection apparatuses, imaging apparatuses, projection imaging apparatuses, projection imaging control apparatuses, or image projection and imaging systems.

17 Claims, 19 Drawing Sheets

(58) Field of Classification Search
USPC .................................................. 353/69, 70
See application file for complete search history.

(56) References Cited

U.S. PATENT DOCUMENTS

| | | | |
|---|---|---|---|
| 11,195,252 B2 * | 12/2021 | Xu | ................... G02B 13/06 |
| 2004/0032649 A1 | 2/2004 | Kondo et al. | |
| 2012/0051666 A1 * | 3/2012 | Minakawa | ............ G06T 3/0062 |
| | | | 382/295 |
| 2014/0169827 A1 | 6/2014 | Hattori et al. | |
| 2015/0189267 A1 * | 7/2015 | Kaji | ................... H04N 9/3182 |
| | | | 348/187 |
| 2018/0232855 A1 | 8/2018 | Fukui | |
| 2020/0380729 A1 * | 12/2020 | Ikeda | ................... G06T 7/80 |

FOREIGN PATENT DOCUMENTS

| | | |
|---|---|---|
| JP | 2004-282711 A | 10/2004 |
| JP | 2005-244835 A | 9/2005 |
| JP | 2007-309660 A | 11/2007 |
| JP | 2015-128242 A | 7/2015 |
| JP | 2015-142157 A | 8/2015 |
| WO | 2016/204068 A1 | 12/2016 |

\* cited by examiner

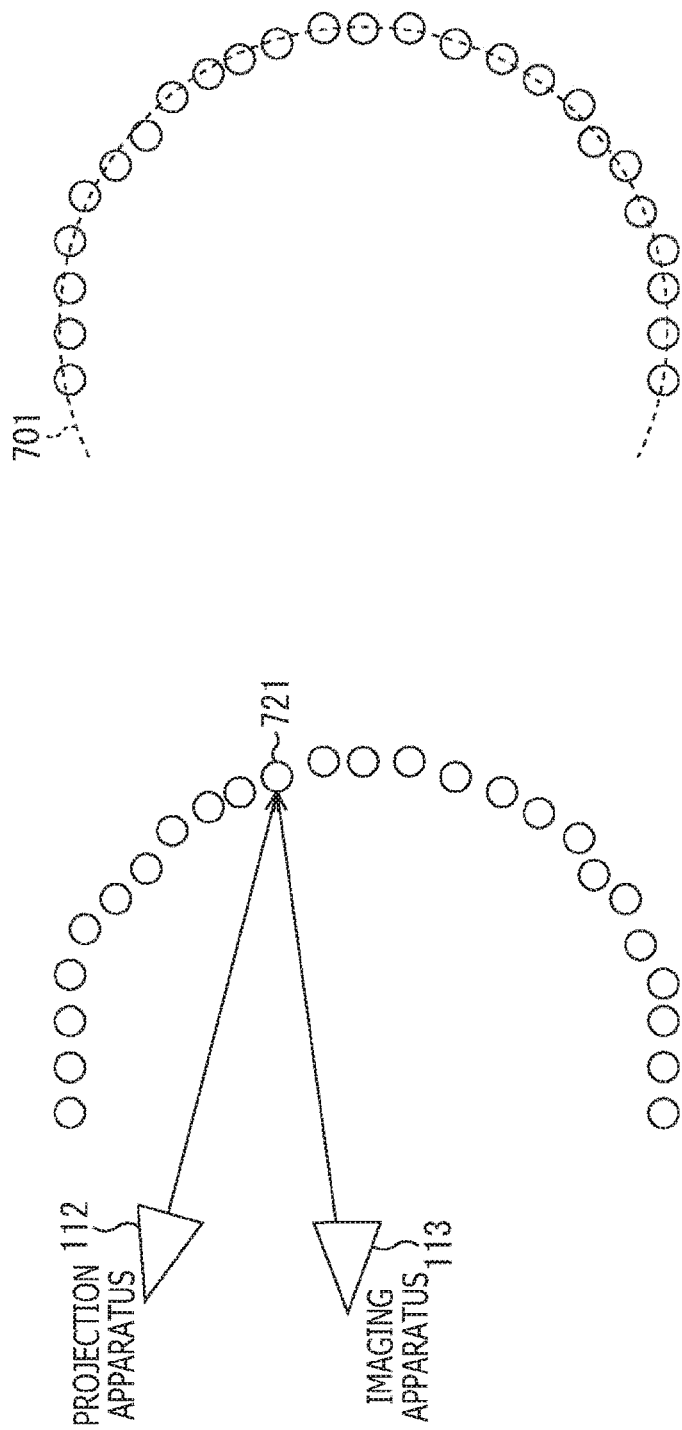

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/002389 filed on Jan. 25, 2019, which claims priority benefit of Japanese Patent Application No. JP 2018-020612 filed in the Japan Patent Office on Feb. 8, 2018. Each of the above-referenced applications is hereby incorporated herein by reference in its entirety.

TECHNICAL FIELD

The present disclosure relates to an information processing apparatus and an information processing method. More particularly, the disclosure relates to an information processing apparatus and an information processing method for suppressing a decrease in the accuracy of image projection correction.

BACKGROUND ART

Heretofore, there have been projection correction techniques for measuring three-dimensional shapes by use of a projector-camera system. Some methods representing the techniques involve three-dimensionally measuring the shape of a projection plane (screen) and geometrically correcting a projected image thereon, based on information regarding the measurements. In order to measure the three-dimensional shape, it is necessary to estimate (calibrate) two kinds of parameters: internal parameters (e.g., focal point distance, principal point, and lens distortion factor) indicative of individual characteristics of the projector and the camera; and external parameters representative of their positions and postures relative to each other.

For example, there have been methods of calibrating beforehand either internal variables or external variables of the projector and camera, the other variables being calibrated on the basis of information regarding the measurements obtained after configuration of the apparatus (e.g., see PTL 1 and PTL 2).

The above-mentioned projection correction techniques for measuring the three-dimensional shape by use of the projector-camera system have been predicated on the use of what is generally called an f tan θ lens system employed in an ordinary projector. In the case of projection correction with a projector-camera system using a projector having the f tan θ lens, the effect of lens distortion in the projector is very small compared with the effect caused by the internal and external parameters. For this reason, performing calibration even without regard to the lens distortion enables projection correction with sufficiently high accuracy.

CITATION LIST

Patent Literature

[PTL 1]
 Japanese Patent Laid-open No. 2015-142157
[PTL 2]
 Japanese Patent Laid-open No. 2005-244835

SUMMARY

Technical Problems

On the other hand, what is generally called the fθ lens involves the effect of lens distortion far larger than the f tan θ lens. Thus, in the case of projection correction with a projector-camera system using a projector having the fθ lens, performing calibration without regard to the lens distortion as in the case of the f tan θ lens system can make the accuracy of projection correction lower than in the case of the f tan θ lens system.

The present disclosure has been made in view of the above circumstances and aims at suppressing a decrease in the accuracy of image projection correction.

Solution to Problems

According to one aspect of the present technology, there is provided an information processing apparatus including a posture estimation section configured such that, by use of an image projection model using a distortion factor of an fθ lens with an image height of incident light expressed by a product of a focal point distance f and an incident angle θ of the incident light, the posture estimation section estimates a posture of a projection section for projecting an image and a posture of an imaging section for capturing a projection plane to which the image is projected.

Also, according to one aspect of the present technology, there is provided an information processing method including, by use of an image projection model using a distortion factor of an fθ lens with an image height of incident light expressed by a product of a focal point distance f and an incident angle θ of the incident light, estimating a posture of a projection section for projecting an image and a posture of an imaging section for capturing a projection plane to which the image is projected.

With the information processing apparatus and the information processing method according to one aspect of the present technology, by use of an image projection model using a distortion factor of an fθ lens with an image height of incident light expressed by a product of a focal point distance f and an incident angle θ of the incident light, a posture of a projection section for projecting an image and a posture of an imaging section for capturing a projection plane to which the image is projected are estimated.

Advantageous Effects of Invention

According to the present disclosure, it is possible to correct image projection. More particularly, the disclosure permits reduction of a decrease in the accuracy of image projection correction.

BRIEF DESCRIPTION OF DRAWINGS

FIGS. 16A and 16B are views depicting how two-dimensional curved surface fitting is typically performed.

DESCRIPTION OF EMBODIMENTS

Figure 1:
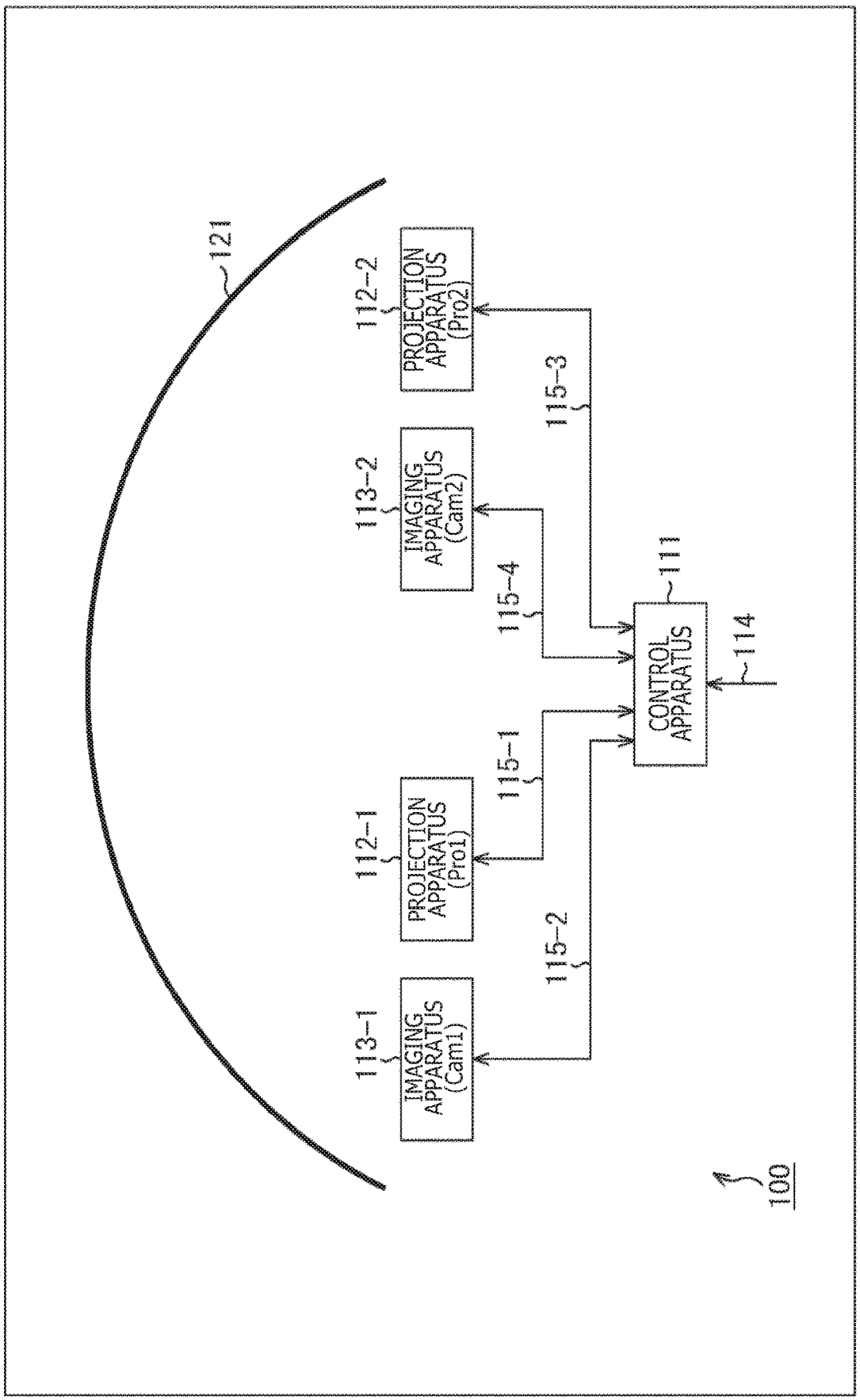
FIG. 1 is a block diagram depicting a principal configuration example of a projection imaging system.

The modes for implementing the present disclosure (hereinafter referred to as the embodiments) are described below. Note that the description will be given in the following order.

1. Image projection correction
2. First embodiment (projection imaging system using the fθ lens)
3. Second embodiment (another configuration example of the projection imaging system)
4. Notes 1. Image Projection Correction <Projection Correction of the f Tan θ Lens System>

In order to project a single image to a screen by using multiple projectors, needed are techniques taking into consideration the distortion of individual images from the projectors on a curved surface of the screen and correcting the projected images accordingly into a geometrically accurate, distortion-free image. Some methods representing such techniques involve getting the configured projectors to project patterns or markers to the screen and causing the cameras or sensors, which are also configured, to obtain information for correction purposes.

For example, two kinds of methods have been proposed as projection correction technique using cameras in non-planar projection: a method using two-dimensional information and based on the appearance of captured images for performing correction; and a method using three-dimensional information and involving estimation (=calibration) of both the internal variables indicative of the characteristics of the cameras and projectors and the external variables representative of their relative positions and postures for correction based on projection ranges of the projectors, i.e., information regarding the measurements of the screen shape.

The method using two-dimensional information involves a simplified apparatus configuration without the need for calibrating the projectors or cameras. However, this method does not guarantee that the corrected image is geometrically accurate (e.g., a straight line when corrected ought to be seen as a straight line from a camera point of view). By contrast, the method using three-dimensional information, with its correction aligned with the screen shape, is more likely to guarantee the geometric accuracy of the resulting image but requires the following procedures for calibration.

That is, with the method using three-dimensional information, the projector projects patterns or makers to a target; the camera captures the projected patterns or markers; and the control apparatus obtains pixel-to-pixel correspondence between the projector and the camera by using the captured image and measures depth information (depth) by using the principle or triangulation. At this time, in measuring the depth from the pixel-to-pixel correspondence between the projector and the camera, the control apparatus is required to follow procedures for estimating the internal variables of the projector and camera and their relative positions and postures, i.e., the control apparatus requires calibration in the case of the method using three-dimensional information.

The above requirements are met, for example, by calibrating all internal and external variables of each of the projector and camera enclosures before configuration of the apparatus. Alternatively, as described in the above-cited PTL 1 and PTL 2, either the internal variables or the external variables of each projector and camera enclosure are calibrated beforehand, with the other variables being calibrated on the basis of the measurement information after configuration of the apparatus.

However, in a case where the projectors or the cameras have been moved or where the internal variables have been changed typically by zoom/shift operations, the above method requires tedious recalibration work. Where a single image is projected by multiple projectors, with the projections left uncorrected, there occurs image misalignment in an overlap region between the projections by the multiple projectors. The misalignment is incurred even by slight movement of a projector after the projection correction. This requires subsequent tedious, time-consuming work on preliminary procedures for recalibration, which is not very practical in an actual operation setup.

Further, the existing calibration methods are based on the assumption that the methods are applied to a system using a projector equipped with what is generally called the f tan θ lens (ordinary lens) of which the image height of light at an incident angle θ is represented by the product of a focal point distance f and tan θ (f·tan θ). In the case of projection correction with a projector-camera system using a projector having the f tan θ lens, the effect of lens distortion in the projector is very small compared with the effect from the internal and external parameters. Thus, performing calibration even without regard to the lens distortion enables projection correction with sufficiently high accuracy.

On the other hand, in the case of recently introduced image projection systems by which, for example, images are projected to the projection plane of a dome-type curved surface (e.g., semispherical shape) to enhance the sense of immersion of a user watching the projected images, it has been proposed to use projectors furnished with what is generally called the fθ lens (also known as the fish-eye lens)

of which the image height of incident light is represented by the product of the focal point distance f and the incident angle θ of the incident light.

Using the fθ lens permits a wider angle of view of the projected image than when the f tan θ lens is used. Thus, the projector using the fθ lens is more suitable for image projection onto the curved surface such as the dome-type projection plane than the projector employing the f tan θ lens.

However, what is generally called the fθ lens is subject to a far higher effect of lens distortion than the f tan θ lens. Thus in the case of projection correction with a projector-camera system using a projector having the fθ lens, performing calibration without regard to the lens distortion as in the case of the f tan θ lens system can make the accuracy of projection correction lower than in the case of the f tan θ lens system.

Whereas the above-cited PTL 1 discloses a projector-camera system using a fish-eye projector, the method described therein involves projecting images to two projection planes, i.e., a plane in the optical axis direction of the projector, and a plane perpendicular to that plane. For this reason, it is difficult to apply this method to image projection onto the dome-type spherical surface screen.

Thus, for image projection correction, an image projection model that uses the distortion factor of the fθ lens with the image height of incident light represented by the product of the focal point distance f and the incident angle θ of the incident light is used to estimate the posture of a projection section for projecting an image and the posture of an imaging section for capturing the projection plane to which the image is projected.

For example, an information processing apparatus includes a posture estimation section for estimating the posture of a projection section that projects an image and the posture of an imaging section that captures the projection plane to which the image is projected, through the use of an image projection model that uses the distortion factor of the fθ lens with the image height of incident light represented by the product of the focal point distance f and the incident angle θ of the incident light.

The above configuration permits posture estimation while correcting the lens distortion of the fθ lens. Thus, even in the case where the fθ lens is used, it is possible to suppress a decrease in the accuracy of image projection correction. In other words, the above configuration enables calibration of the internal and external parameters of the projection section and imaging section with sufficiently high accuracy. That is, image projection correction is easier to perform, so that the robustness of the accuracy of parameters in the face of environmental changes is enhanced. This enables practical operation of the image projection system that uses the fθ lens.

2. First Embodiment

<Projection Imaging System>

FIG. 1 is a block diagram depicting a principal configuration example of a projection imaging system to which the present technology is applied. In FIG. 1, a projection imaging system 100 is a system that projects images to a projection plane and calibrates parameters by using images captured of the images projected onto the projection plane.

As depicted in FIG. 1, the projection imaging system 100 includes a control apparatus 111, a projection apparatus 112-1, an imaging apparatus 113-1, a projection apparatus 112-2, and an imaging apparatus 113-2. The projection apparatus 112-1, the imaging apparatus 113-1, the projection apparatus 112-2, and the imaging apparatus 113-2 are communicably connected with the control apparatus 111 via cables 115-1 to 115-4, respectively.

In the description that follows, the projection apparatuses 112-1 and 112-2 will be referred to as the projection apparatus or apparatuses 112 in the case where there is no need for their individual explanation. Also, the imaging apparatuses 113-1 and 113-2 will be referred to as the imaging apparatus or apparatuses 113 where there is no need for their individual explanation. Further, the cables 115-1 to 115-4 will be referred to as the cable or cables 115 where there is no need for their individual explanation.

The control apparatus 111 controls each projection apparatus 112 and each imaging apparatus 113 via the cables 115. For example, the control apparatus 111 is supplied with an image via a cable 114. The control apparatus 111 feeds the image to each projection apparatus 112 that in turn projects the image to a dome-type (partially spherical surface-shaped) screen 121. As another example, the control apparatus 111 causes each imaging apparatus 113 to capture the screen 121 (e.g., image projected onto the screen 121) and acquires the captured image.

As a further example, the control apparatus 111 calibrates the parameters of the projection apparatuses 112 and imaging apparatuses 113 by using the captured image, thereby calculating the parameters for geometrically correcting the images to be projected by the projection apparatuses 112. Using the calculated parameters, the control apparatus 111 geometrically corrects images supplied from the outside and feeds the geometrically corrected images to the projection apparatuses 112.

The projection apparatuses 112 each have the function of what is generally called a projector. For example, under the control of the control apparatus 111, the projection apparatuses 112 project to the screen 121 images supplied from the control apparatus 111. The projection apparatuses 112 under the control of the control apparatus 111 operate in cooperation with each other to perform image projection such that a single projected image appears on the screen 121 (i.e., one projected image is displayed on the screen 121).

For example, the multiple projection apparatuses 112 perform image projection in such a manner that the images projected are arranged side by side with no gap therebetween on the screen 121, thereby obtaining a projected image larger (with high resolution) than the image projected by a single projection apparatus 112 (i.e., such a projected image is displayed on the screen 121). As another example, the multiple projection apparatuses 112 perform image projection in such a manner that the images projected coincide with each other in position on the screen 121, thereby acquiring an image brighter (of high dynamic range) than the image projected by a single projection apparatus 112 (i.e., such a projected image is displayed on the screen 121). That is, the projection imaging system 100 in such a case is what is generally called a multi-projection system that implements what is known as projection mapping.

The imaging apparatuses 113 each have the function of what is generally called a camera. For example, under the control of the control apparatus 111, the imaging apparatuses 113 capture the screen 121 (i.e., screen 121 to which images are projected by the projection apparatuses 112) and feeds data of the captured images (also called captured image data) to the control apparatus 111. The captured images are used by the control apparatus 111 in calculating the parameters for geometrically correcting images (i.e., in calibrating the parameters of the projection apparatuses 112 and imaging apparatuses 113). That is, the imaging apparatuses 113 are configured to geometrically correct the images to be projected (i.e., configured to calculate the parameters for geometric correction).

The screen 121 is an approximately dome-shaped (partially spherical surface-shaped) projection plane. Configured to be a curved surface, the screen 121 allows images to be projected (displayed) thereon with a wider viewing angle than when the images are projected onto a flat screen. This enables the user to experience more realistic sensations and a deeper sense of immersion.

Further, the projection apparatuses 112 and the imaging apparatuses 113 each include what is generally called the fθ lens (also known as the fish-eye lens) instead of what is generally called the f tan θ lens (ordinary lens). It follows that the images projected by the projection apparatuses 112 or captured by the imaging apparatuses 113 each have larger distortion, particularly in a peripheral region, than in the case of the f tan θ lens.

<Control Apparatus>

Figure 2:
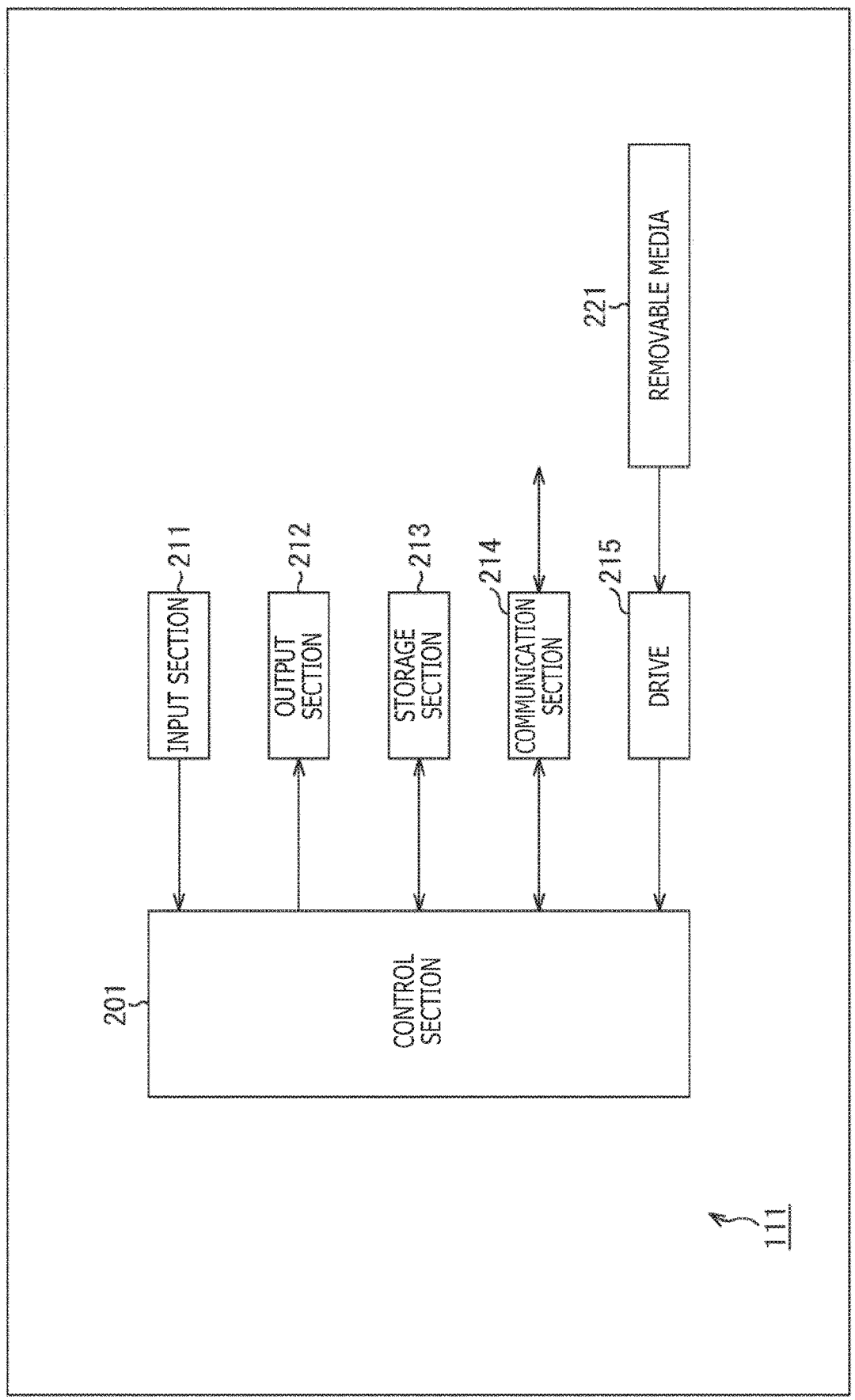
FIG. 2 is a block diagram depicting a principal configuration example of a control apparatus.

FIG. 2 is a block diagram depicting a principal configuration example of the control apparatus 111 as an embodiment of the information processing apparatus to which the present technology is applied. It is to be noted that FIG. 2 depicts major processing blocks and principal data flows therebetween and does not cover the entire configuration of the control apparatus 111. That is, the control apparatus 111 may include processing blocks that are not illustrated in FIG. 11 as well as data flows and processes other than those indicated by arrows in FIG. 2.

As depicted in FIG. 2, the control apparatus 111 includes a control section 201, an input section 211, an output section 212, a storage section 213, a communication section 214, and a drive 215.

The control section 201 performs processes related to controls. For example, the control section 201 controls any configured elements in the control apparatus 111. The control section 201 also performs processes related to controls over other apparatuses such as the projection apparatuses 112 and imaging apparatuses 113. The control section 201 may be configured in any manner desired. For example, the control section 201 may include a CPU (Central Processing Unit), a ROM (Read Only Memory), and RAM (Random Access Memory), the CPU loading programs and data from the ROM into the RAM and executing and operating on the loaded programs and data to carry out relevant processes.

The input section 211 includes input devices for accepting information from the outside such as the input from the user. For example, the input section 211 may include a keyboard, a mouse, operation buttons, a touch panel, a camera, a microphone, and input terminals. The input section 211 may further include various sensors such as an acceleration sensor, an optical sensor, and a temperature sensor, as well as input equipment such as a barcode reader. The output section 212 includes output devices for outputting information such as images and sounds. For example, the output section 212 may include a display unit, speakers, and output terminals.

The storage section 213 includes storage media for storing information such as programs and data. For example, the storage section 213 may include a hard disk, a RAM disk, and a nonvolatile memory. The communication section 214 includes a communication device for communicating with external apparatuses by sending and receiving information such as programs and data thereto and therefrom via predetermined communication media (e.g., suitable networks such as the Internet). For example, the communication section 214 may include a network interface. The communication section 214 performs communication (i.e., exchanges programs and data), for example, with apparatuses external to the control apparatus 111 (e.g., projection apparatuses 112 and imaging apparatuses 113). Preferably, the communication section 214 may have a wired communication function or a wireless communication function, or both.

The drive 215 retrieves information (e.g., programs and data) from removable media 221 such as a magnetic disk, an optical disk, a magneto-optical disk, or a semiconductor memory attached to the drive 215. The drive 215 supplies the information retrieved from the removable media 221 to the control section 201, among others. In the case where a rewritable piece of the removable media 221 is attached to the drive 215, the drive 215 can have the information (e.g., programs and data) supplied from the control section 201 stored in the attached piece of removable media 221.

<Functional Blocks of the Control Apparatus>

Figure 3:
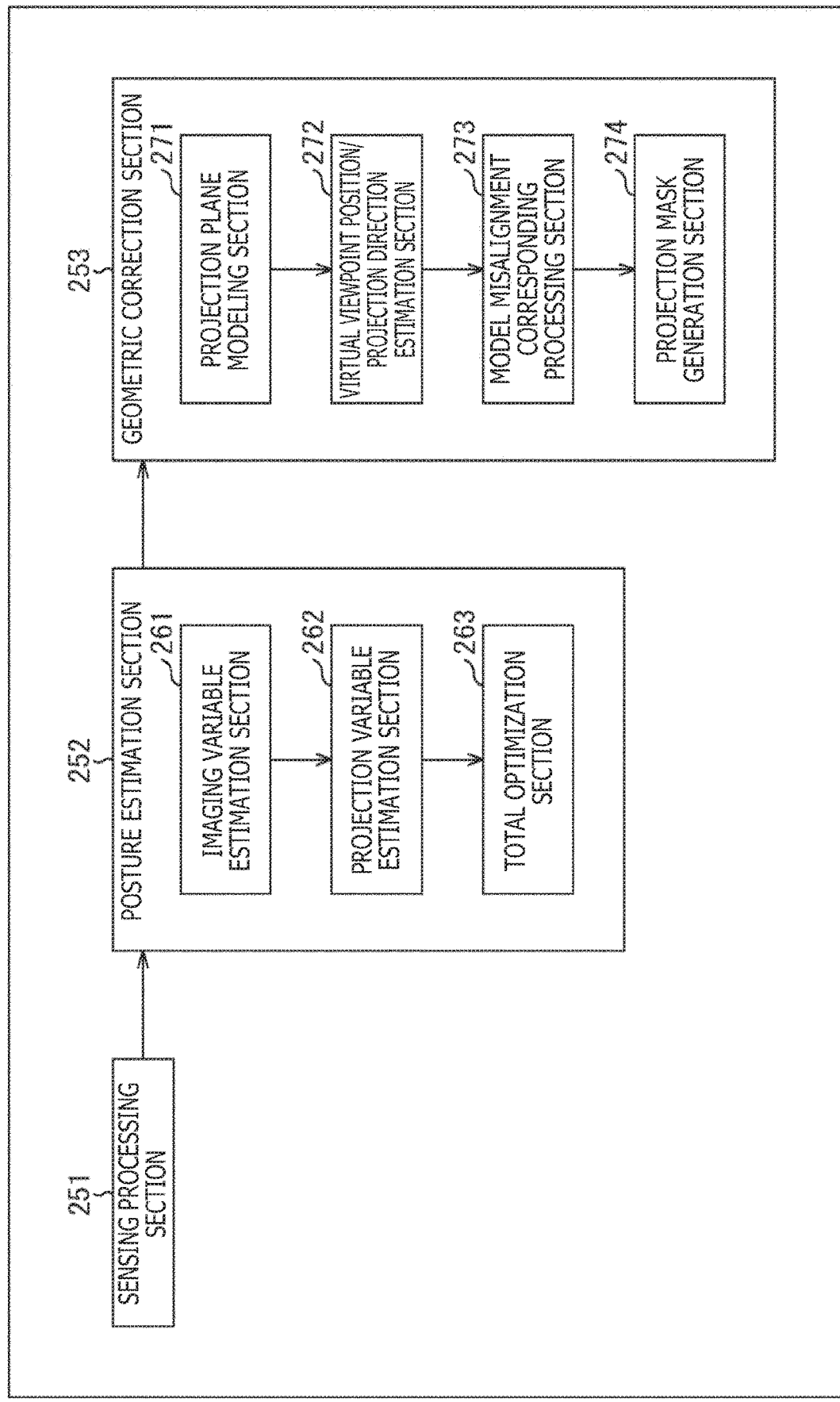
FIG. 3 is a functional block diagram depicting examples of major functional blocks implemented by a control section.

FIG. 3 is a functional block diagram depicting examples of major functional blocks implemented by the control apparatus 111 performing programs, for example. As depicted in FIG. 3, the control apparatus 111 executes programs to implement the functions of a sensing processing section 251, a posture estimation section 252, and a geometric correction section 253, for example.

The sensing processing section 251 performs processes related to sensing. For example, the sensing processing section 251 performs the process of detecting corresponding points between the pixels of the projection apparatus 112 and those of the imaging apparatus 113 by using captured images from the imaging apparatuses 113. The sensing processing section 251 supplies the posture estimation section 252 with the result of the process (i.e., information regarding the corresponding points between the projection apparatus 112 and the imaging apparatus 113).

The posture estimation section 252 performs processes related to estimation of the postures of the projection apparatuses 112 and imaging apparatuses 113. For example, using an image projection model that uses the distortion factor of the fθ lens, the posture estimation section 252 estimates the parameters (variables) related to the postures of at least either the projection apparatuses 112 or the imaging apparatuses 113 (i.e., calculates the estimates of the variables related to postures).

The posture-related parameters may be of any suitable type. For example, the parameters may include the internal parameters (also called internal variables) of at least either the projection apparatuses 112 or the imaging apparatuses 113. The internal parameters may be of any suitable type. For example, the internal parameters may include at least one of the focal point distance, principal point, or the parameter ($k_{inv}$) corresponding to inverse transformation of the lens distortion factor of the projection apparatus 112 or the imaging apparatus 113.

Alternatively, the posture-related parameters may include the external parameters (also called external variables) of at least either the projection apparatuses 112 or the imaging apparatuses 113. The external parameters may be of any suitable type. For example, the external parameters may include at least either a rotation matrix or a translation vector with respect to the origin of a world coordinate system of the projection apparatus 112 or of the imaging apparatus 113.

The posture estimation section 252 estimates the posture-related parameters, based on the information regarding the corresponding points between the projection apparatus 112 and the imaging apparatus 113, the information being supplied from the sensing processing section 251. The posture estimation section 252 also estimates the posture-related parameters, based on representative values of the internal parameters (also called internal variable representative values) of at least either the projection apparatuses 112 or the imaging apparatuses 113 having been determined beforehand.

The posture estimation section 252 supplies the geometric correction section 253 with the obtained parameter estimates (at least either the internal parameter estimates (also called internal variable estimates) or the external parameter estimates (also called external variable estimates) of at least either the projection apparatuses 112 or the imaging apparatuses 113).

The geometric correction section 253 performs processes related to geometric correction of images. For example, on the basis of the parameter estimates supplied from the posture estimation section 252, the geometric correction section 253 calculates the parameters (e.g., vector data for geometric correction) for use in geometric correction of the images input from the outside via the cable 114.

<Posture Estimation Section>

As depicted in FIG. 3, the posture estimation section 252 includes an imaging variable estimation section 261, a projection variable estimation section 262, and a total optimization section 263.

The imaging variable estimation section 261 performs processes related to estimating at least either the internal parameters or the external parameters of the imaging apparatuses 113 (the parameters are also called imaging variables). The projection variable estimation section 262 performs processes related to estimating at least either the internal parameters or the external parameters of the projection apparatuses 112 (the parameters are also called projection variables). The total optimization section 263 performs processes related to optimizing the estimates of the imaging variables (also called imaging variable estimates) obtained by the imaging variable estimation section 261 and the estimates of the projection variables (also called the projection variable estimates) acquired by the projection variable estimation section 262.

In this manner, the posture estimation section 252 estimates the imaging variables and projection variables and, through total optimization, obtains at least either the internal variable estimates or the external variable estimates of at least either the projection apparatuses 112 or the imaging apparatuses 113.

At this time, the posture estimation section 252 performs the above-described posture estimation by using the image projection model that uses the distortion factor of the fθ lens. That is, the imaging variable estimation section 261 obtains the imaging variable estimates by using the image projection model that uses the distortion factor of the fθ lens. Likewise, the projection variable estimation section 262 acquires the projection variable estimates by use of the image projection model that uses the distortion factor of the fθ lens. Similarly, the total optimization section 263 optimizes all of these parameters through the use of the image projection model that uses the distortion factor of the fθ lens.

Thus, even in the case where the projection apparatuses 112 or the imaging apparatuses 113 use the fθ lens, the control apparatus 111 can suppress a decrease in the accuracy of image projection correction. This permits practical operation of the projection imaging system 100 using the fθ lens.

<Geometric Correction Section>

Further, as depicted in FIG. 3, the geometric correction section 253 includes a projection plane modeling section 271, a virtual viewpoint position/projection direction estimation section 272, a model misalignment corresponding processing section 273, and a projection mask generation section 274.

The projection plane modeling section 271 performs processes related to projection plane modeling (functionalization of curved surface). The virtual viewpoint position/projection direction estimation section 272 performs processes related to estimating a virtual viewpoint position serving as a reference point for distortion correction and an image projection direction relative to that virtual viewpoint position. The model misalignment corresponding processing section 273 performs a corresponding process for suppressing misalignment between the actual projection plane and the model thereof (also called model misalignment). The projection mask generation section 274 performs processes related to generating projection masks for limiting the range in which the projection apparatuses 112 project images.

<Projection Apparatuses>

Figure 4:
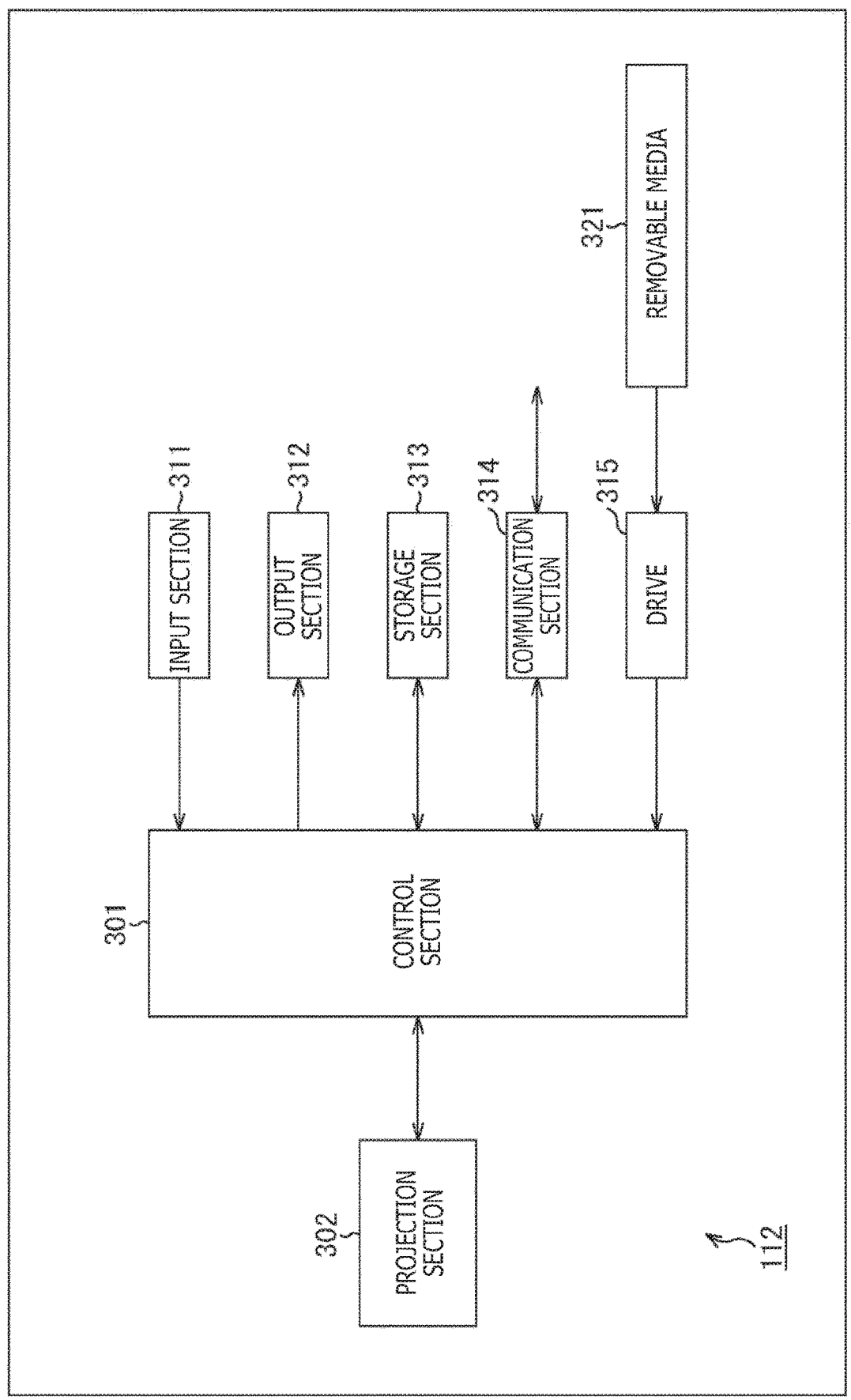
FIG. 4 is a block diagram depicting a principal configuration example of a projection apparatus.

FIG. 4 is a block diagram depicting a principal configuration example of the projection apparatus 112 as one embodiment of the information processing apparatus to which the present technology is applied. It is to be noted that FIG. 4 depicts major processing blocks and principal data flows therebetween and does not cover the entire configuration of the projection apparatus 112. That is, the projection apparatus 112 may include processing blocks that are not illustrated in FIG. 4 as well as data flows and processes other than those indicated by arrows in FIG. 4.

As depicted in FIG. 4, the projection apparatus 112 includes a control section 301, a projection section 302, an input section 311, an output section 312, a storage section 313, a communication section 314, and a drive 315.

The control section 301 performs processes related to controls. For example, the control section 301 controls any configured elements in the projection apparatus 112. For example, the control section 301 controls drive of the projection section 302. The control section 301 may be configured in any manner desired. For example, the control section 301 may include a CPU, a ROM, and RAM, the CPU loading programs and data from the ROM into the RAM and executing and operating on the loaded programs and data to carry out relevant processes.

The projection section 302 under the control of the control section 301 performs processes related to image projection. For example, the projection section 302 acquires from the control section 301 the image data supplied from the control apparatus 111 and projects the acquired image to the screen 121. The projection section 302 has the fθ lens as mentioned above, so that the image is projected to the screen 121 via the fθ lens.

The input section 311 includes input devices for accepting information from the outside such as the input from the user. For example, the input section 311 may include a keyboard, a mouse, operation buttons, a touch panel, a camera, a microphone, and input terminals. The input section 311 may further include various sensors such as an acceleration sensor, an optical sensor, and a temperature sensor, as well as input equipment such as a barcode reader. The output section 312 includes output devices for outputting information such as images and sounds. For example, the output section 312 may include a display unit, speakers, and output terminals.

The storage section 313 includes storage media for storing information such as programs and data. For example, the storage section 313 may include a hard disk, a RAM disk, and a nonvolatile memory. The communication section 314 includes a communication device for communicating with external apparatuses by sending and receiving information such as programs and data thereto and therefrom via predetermined communication media (e.g., suitable networks such as the Internet). For example, the communication section 314 may include a network interface. The communication section 314 performs communication (i.e., exchanges programs and data), for example, with apparatuses external to the projection apparatus 112 (e.g., control apparatus 111). Preferably, the communication section 314 may have a wired communication function or a wireless communication function, or both.

The drive 315 retrieves information (e.g., programs and data) from removable media 321 such as a magnetic disk, an optical disk, a magneto-optical disk, or a semiconductor memory attached to the drive 315. The drive 315 supplies the information retrieved from the removable media 321 to the control section 301, among others. In the case where a rewritable piece of the removable media 321 is attached to the drive 315, the drive 315 can have the information (e.g., programs and data) supplied from the control section 301 stored in the attached piece of removable media 321.

<Imaging Apparatuses>

Figure 5:
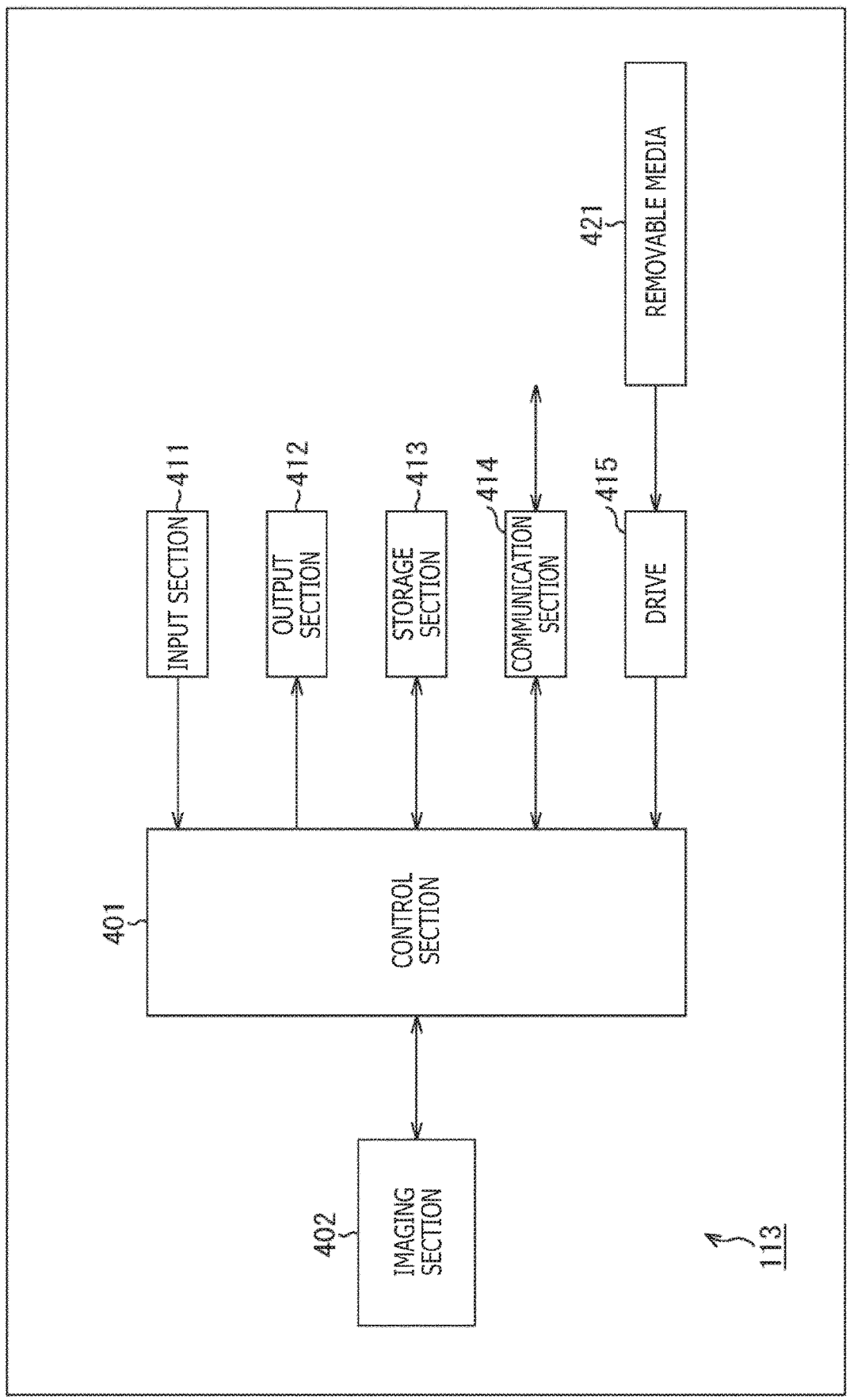
FIG. 5 is a block diagram depicting a principal configuration example of an imaging apparatus.

FIG. 5 is a block diagram depicting a principal configuration example of the imaging apparatus 113 as one embodiment of the information processing apparatus to which the present technology is applied. It is to be noted that FIG. 5 depicts major processing blocks and principal data flows therebetween and does not cover the entire configuration of the imaging apparatus 113. That is, the imaging apparatus 113 may include processing blocks that are not illustrated in FIG. 5 as well as data flows and processes other than those indicated by arrows in FIG. 5.

As depicted in FIG. 5, the imaging apparatus 113 includes a control section 401, an imaging section 402, an input section 411, an output section 412, a storage section 413, a communication section 414, and a drive 415.

The control section 401 performs processes related to controls. For example, the control section 401 controls any configured elements in the imaging apparatus 113. For example, the control section 401 controls drive of the imaging section 402. The control section 401 may be configured in any manner desired. For example, the control section 401 may include a CPU, a ROM, and RAM, the CPU loading programs and data from the ROM into the RAM and executing and operating on the loaded programs and data to carry out relevant processes.

The imaging section 402 under the control of the control section 401 performs processes related to capturing an imaged subject. For example, the imaging section 402 captures the image projected to the screen 121 by the projection apparatus 112 so as to obtain captured image data. The imaging section 402 supplies the captured image data to the control section 401. In turn, the control section 401 supplies the captured image data to the control apparatus 111 via the communication section 414. Note that the imaging section 402 has the fθ lens as mentioned above, so that the imaging section 402 captures the screen 121 (i.e., projected image) via the fθ lens.

The input section 411 includes input devices for accepting information from the outside such as the input from the user. For example, the input section 411 may include a keyboard, a mouse, operation buttons, a touch panel, a camera, a microphone, and input terminals. The input section 411 may further include various sensors such as an acceleration sensor, an optical sensor, and a temperature sensor, as well as input equipment such as a barcode reader. The output section 412 includes output devices for outputting information such as images and sounds. For example, the output section 412 may include a display unit, speakers, and output terminals.

The storage section 413 includes storage media for storing information such as programs and data. For example, the storage section 413 may include a hard disk, a RAM disk, and a nonvolatile memory. The communication section 414 includes a communication device for communicating with external apparatuses by sending and receiving information such as programs and data thereto and therefrom via predetermined communication media (e.g., suitable networks such as the Internet). For example, the communication section 414 may include a network interface. The communication section 414 performs communication (i.e., exchanges programs and data), for example, with apparatuses external to the imaging apparatus 113 (e.g., control apparatus 111). Preferably, the communication section 414 may have a wired communication function or a wireless communication function, or both.

The drive 415 retrieves information (e.g., programs and data) from removable media 421 such as a magnetic disk, an optical disk, a magneto-optical disk, or a semiconductor memory attached to the drive 415. The drive 415 supplies the information retrieved from the removable media 421 to the control section 401, among others. In the case where a rewritable piece of the removable media 421 is attached to the drive 415, the drive 415 can have the information (e.g., programs and data) supplied from the control section 401 stored in the attached piece of removable media 421.

<Flow of the Calibration Process>

The processing performed by the above-described projection imaging system 100 is explained below. The control apparatus 111 in the projection imaging system 100 performs a calibration process to calibrate the projection variables (internal and external parameters of the projection apparatuses 112) and the imaging variables (internal and external parameters of the imaging apparatuses 113).

A typical flow of the calibration process is explained below with reference to the flowchart of FIG. 6. When the calibration process is started, the sensing processing section 251 performs a sensing process in step S101 to detect corresponding points.

Figure 7:
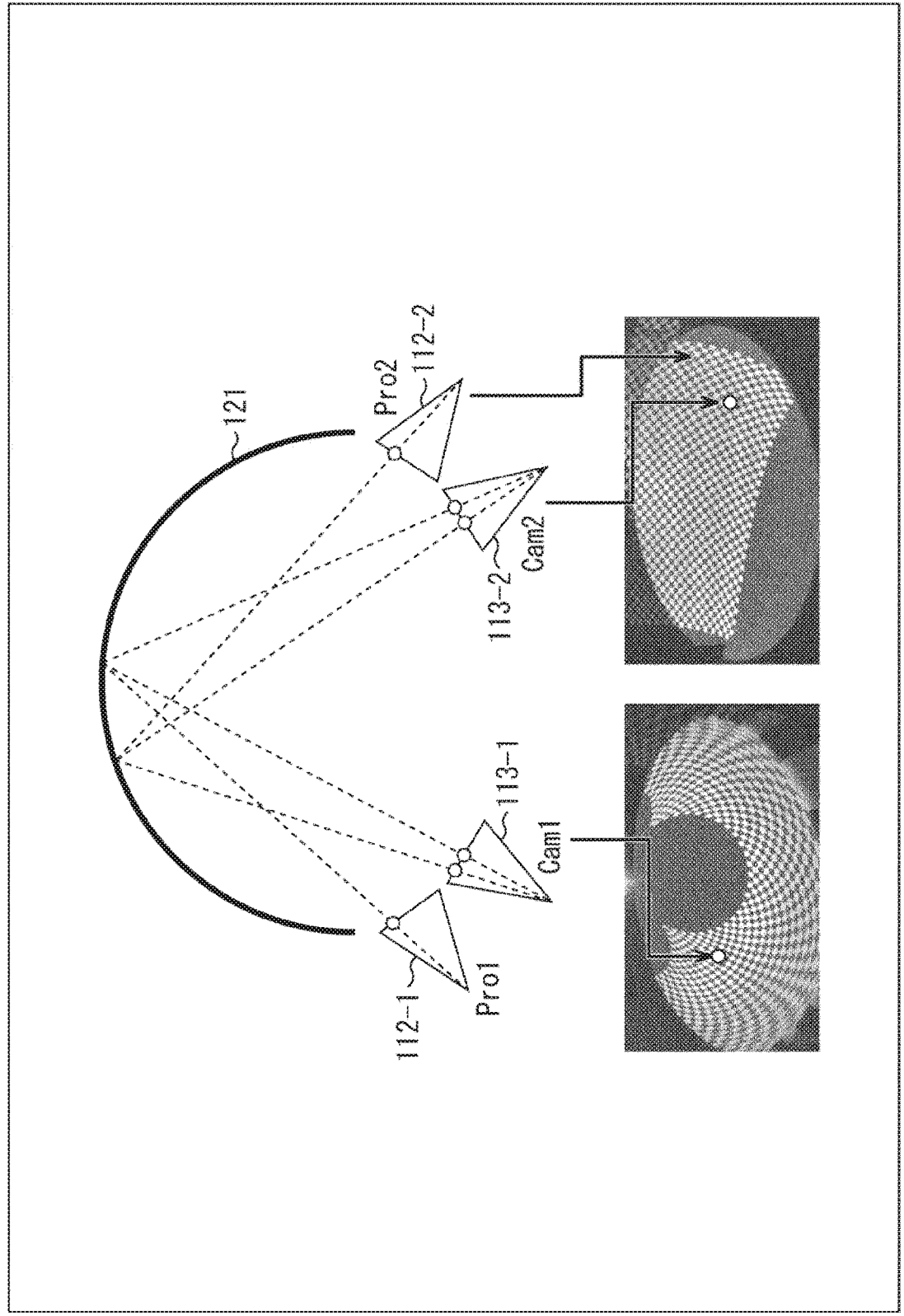
FIG. 7 is a view depicting how pixel-to-pixel correspondence is obtained using structured light.

In the sensing process, as depicted in the example of FIG. 7, the Structured Light method is used to obtain pixel-to-pixel correspondence between the projection apparatus 112 (e.g., projector) and the imaging apparatus 113 (e.g., camera). More specifically, the projection apparatus 112 (projector) projects to the dome-type screen 121 patterns with their pixels encoded in the time direction (e.g., gray code or checker pattern) while switching the patterns in time series. Further, the imaging apparatus 113 (camera) captures a projected image of each of these patterns. On the basis of each of the patterns included in the captured images, the control apparatus 111 obtains the corresponding points between the pixels of the projection apparatus 112 and those of the imaging apparatus 113. When the information regarding the corresponding points (i.e., corresponding points between the projection and imaging apparatuses) has been obtained, the process advances to step S102.

In step S102, the posture estimation section 252 performs a posture estimation process based on the information regarding the corresponding points obtained in step S101, so as to obtain the internal and external variable estimates of each of the projection apparatuses 112 and imaging apparatuses 113.

Note that posture estimation section 252 initially regards the internal and external variables of the projection apparatuses 112 and imaging apparatuses 113 as unknowns. After the projection apparatuses 112 and imaging apparatuses 113 have been suitably arranged relative to the screen 121 to which the projection apparatuses 112 project images, the posture estimation section 252 estimates the variables according to this arrangement. That is, with the present method, there is no need to perform preliminary calibration procedures on the internal and external variables of the projection apparatuses 112 and imaging apparatuses 113.

However, the projection apparatuses 112 and imaging apparatuses 113 may preferably retain as initial values the representative values of their internal variables (e.g., focal point distance, principal point, and lens distortion). The posture estimation section 252 may then perform the posture estimation process using these representative values. For example, the focal point distance and the principal point may be set on the basis of the resolution of captured and projected images. An average of the values obtained by calibrating multiple projection apparatuses 112 and imaging apparatuses 113 beforehand may be used as the lens distortion factor. These internal variables are used solely as the initial values. In the processing of step S102 (posture estimation process), the posture estimation section 252 estimates again all these internal variables. Thus, even in the case where the projection apparatuses 112 and imaging apparatuses 113 are configured with projection and imaging apparatuses not used for obtaining the representative values of the internal variables, performing the posture estimation process makes it possible to suppress a decrease in the accuracy of image projection correction.

Note that, by carrying out the posture estimation process, the posture estimation section 252 further estimates the external variables of the projection apparatuses 112 and imaging apparatuses 113. Obtaining the external variables does not require preparing their initial values beforehand. It is possible to automatically estimate the external variables in a state where they are completely unknown.

After the internal and external variable estimates of each of the projection apparatuses 112 and imaging apparatuses 113 have been acquired by the above-described posture estimation process, the process advances to step S103.

In step S103, the geometric correction section 253 obtains vector data for geometric correction by performing a geometric correction process using the internal and external variable estimates of each of the projection apparatuses 112 and imaging apparatuses 113 acquired in the processing of step S102.

Upon completion of the processing in step S103, the calibration process is terminated.

<Flow of the Posture Estimation Process>

Figure 6:
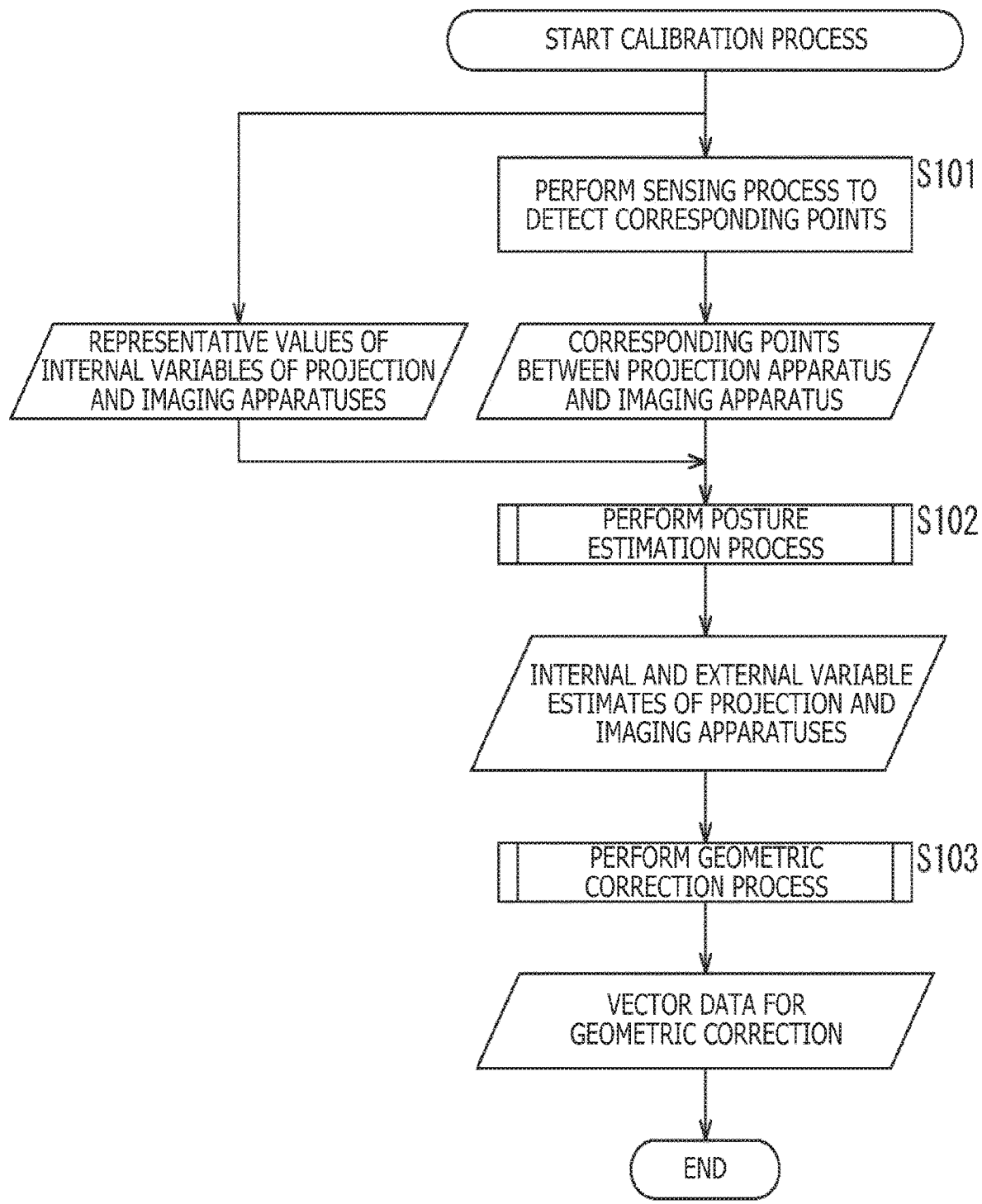
FIG. 6 is a flowchart explaining a typical flow of a calibration process.

A typical flow of the posture estimation process performed in step S102 of FIG. 6 is explained below with reference to the flowchart of FIG. 8.

When the posture estimation process is started, the imaging variable estimation section 261 in the posture estimation section 252 estimates the internal and external variables of the imaging apparatuses 113 (i.e., imaging variables) in step S121. As mentioned above, it is not necessary to estimate the external variables beforehand because they can be estimated by this process. The representative values of the internal variables are used as their initial values. At this time, the imaging variable estimation section 261 estimates the posture-related parameters of the imaging apparatuses 113 (i.e., imaging variables) by using the image projection model that uses the distortion factor of the fθ lens. With the imaging variables estimated, the process advances to step S122.

In step S122, the projection variable estimation section 262 estimates the internal and external variables of the projection apparatuses 112 (i.e., projection variables). The projection variables are estimated in a manner similar to the case where the imaging variables are estimated in step S121.

In step S123, the total optimization section 263 optimizes the estimates of the imaging variables obtained in step S121 (internal and external variable estimates of the imaging apparatuses 113) and the estimates of the projection variables acquired in step S122 (internal and external variable estimates of the projection apparatuses 112).

After each of the variable estimates is optimized and after the processing of step S123 is terminated, the posture estimation process comes to an end. The process then returns to the flowchart of FIG. 6.

As described above, the posture estimation section 252 performs the posture estimation process to individually estimate and optimize the internal parameters (focal point distance, principal point, and parameter $k_{inv}$ corresponding to inverse transformation of the lens distortion factor) and the external parameters (rotation matrix and translation vector with respect to the origin of a world coordinate system) of the projection apparatuses 112, before finally and simultaneously optimizing the parameters to obtain the final estimates.

<Image Projection Model>

Explained next is the estimation of the imaging variables (step S121) as well as the estimation of the projection variables (step S122) performed during the above-described posture estimation process. The imaging variables and the projection variables are estimated basically using similar methods. These variables are estimated using the image projection model that uses the fθ lens.

The definition of the above model is explained first. When a three-dimensional point P in a three-dimensional space has a coordinate value X in a world coordinate system and when the point P is transformed to a camera coordinate system, the coordinate value X is transformed to a coordinate value $X_c$ as expressed by the following mathematical expression (1), by using a rotation matrix R and a translation vector T for transformation from the world coordinate system to the camera coordinate system.

[Math 1]

$$X_c = RX + T \quad (1)$$

where, $x = X_{c1}$, $y = X_{c2}$, $Z = X_{c3}$

When the point P is projected to a plane z=1 as a perspective projection model, the point P is given homogeneous coordinates a,b from which an angle of view θ is obtained as defined by the following expressions (2) to (5).

[Math. 2]

$$a = \frac{x}{z} \quad (2)$$

[Math. 3]

$$b = \frac{y}{z} \quad (3)$$

[Math. 4]

$$r^2 = a^2 + b^2 \quad (4)$$

[Math. 5]

$$\theta = \arctan(r) \quad (5)$$

Here, with the distortion factor k of the fish-eye lens defined as in the following expression (6), homogeneous coordinates x',y' in consideration of the distortion are calculated as expressed by the following expressions (7) to (9).

[Math. 6]

$$k=[k_1 k_2 k_3 k_4]^T \qquad (6)$$

[Math. 7]

$$\theta_d = \theta(1 + k_1\theta^2 + k_2\theta^4 + k_3\theta^6 + k_4\theta^8) \qquad (7)$$

[Math. 8]

$$x' = (\theta_d/r)a \qquad (8)$$

[Math. 9]

$$y' = (\theta_d/r)b \qquad (9)$$

The above term $(\theta_d/r)$ represents misalignment in image coordinates due to the lens distortion and, when k=0, corresponds to an ideal fish-eye lens model (r=fθ). Finally, the coordinates x',y' that become image coordinates u,v when transformed to the camera coordinate system are calculated using focal point distances fx,fy as expressed by the expressions (10) and (11) below. Note that in the expressions, the terms cx,cy denote the principal points of the camera, and the value α is a parameter indicative of a shear factor, with α=0 this time.

[Math. 10]

$$u = f_x(x' + \alpha y') + c_x \qquad (10)$$

[Math. 11]

$$v = f_y y' + c_y \qquad (11)$$

In this case, the internal parameters (e.g., focal point distance and principal point) of the projection apparatuses 112 and imaging apparatuses 113 may be expressed by the expression (12) below. In the case where the scale in the depth direction is assumed to be 1, the internal parameters may be expressed by the expression (13) below. Thus, when the parameters are multiplied by A or by $A^{-1}$, mutual transformation between two-dimensional image coordinates and three-dimensional coordinates is made possible.

[Math. 12]

$$A = \begin{bmatrix} f_x & 0 & c_x \\ 0 & f_y & c_y \\ 0 & 0 & 1 \end{bmatrix} \qquad (12)$$

[Math. 13]

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} x' \\ y' \\ 1 \end{bmatrix} \qquad (13)$$

Using this model makes it possible to implement the process of re-projecting points in a three-dimensional space first onto an image plane before transforming the points to the image coordinates that take into consideration the lens distortion in the case of using the fish-eye lens (fθ lens).

<Parameter Corresponding to Inverse Transformation of the Lens Distortion Factor>

In order to perform a ray trace using the above-described model, the present method uses the parameter $k_{inv}$ corresponding to inverse transformation of the lens distortion factor. With this method, it is assumed that a three-dimensional space in which the target to be measured exists is an ideal space free of distortion and that the pixel value expressed in the image coordinate system of the projection apparatuses 112 (or imaging apparatuses 113) and corresponding to a point in a three-dimensional space includes distortion. At this time, a pixel p' in the image coordinate system of the projection apparatuses 112 (or imaging apparatuses 113) is subjected to distortion correction to obtain an ideal coordinate value p (free of distortion), which in turn is projected to a three-dimensional space to acquire a light ray on which exists a three-dimensional point P corresponding to the point p'. Thus, on the basis of the pixel-to-pixel correspondence between the projection apparatus 112 and the imaging apparatus 113, corresponding ideal coordinates are projected to the three-dimensional space to obtain multiple light rays of which the intersection point is measured as a three-dimensional point corresponding to each pixel.

With the above-described model, the value k is defined as the parameter for re-projecting a point from the three-dimensional space in the direction of a distorted two-dimensional image. Usually, projecting a point in the direction of the three-dimensional space through distortion correction requires repeated compensation of the distortion of each pixel. By contrast, the present method introduces the parameter $k_{inv}$ corresponding to inverse transformation of the lens distortion factor k in order to perform distortion correction on the coordinate values of the projection apparatuses 112 and imaging apparatuses 113 by use of the above-described expressions (7) to (9). Using the parameter $k_{inv}$ permits unified distortion correction on all pixels. Further, compared with methods of compensating each pixel, this method suppresses an increase in calculation costs. The parameter kin, is initially estimated by the procedure below using the value of the distortion factor k. Thereafter, the parameter $k_{inv}$ is estimated again in optimization steps (parameter estimation process), to be discussed later.

The mathematical expression (7) above is arranged with respect to the distortion factor k and expressed in matrix form as defined by the following expression (14).

[Math. 14]

$$\theta_d - \theta = [\theta^3 \ \theta^5 \ \theta^7 \ \theta^9] \begin{bmatrix} k_1 \\ k_2 \\ k_3 \\ k_4 \end{bmatrix} \qquad (14)$$

The expression (14) above is obtained for each angle of view el corresponding to one pixel in the images of the projection apparatuses 112 and imaging apparatuses 113. Thus, the process of lens distortion transformation on "n" pixels is expressed by multiplication of an (n×4) matrix with a (4×1) matrix as defined by the following expression (15).

[Math. 15]

$$\begin{bmatrix} \theta_{d1} - \theta_1 \\ \theta_{d2} - \theta_2 \\ \vdots \\ \theta_{dn} - \theta_n \end{bmatrix} = \begin{bmatrix} \theta_1^3 & \theta_1^5 & \theta_1^7 & \theta_1^9 \\ \theta_2^3 & \theta_2^5 & \theta_2^7 & \theta_2^9 \\ \vdots & \vdots & \vdots & \vdots \\ \theta_n^3 & \theta_n^5 & \theta_n^7 & \theta_n^9 \end{bmatrix} \begin{bmatrix} k_1 \\ k_2 \\ k_3 \\ k_4 \end{bmatrix} \qquad (15)$$

Here, an angle θi before distortion transformation and an angle θdi (where I=1, 2, . . . , n) thereafter are swapped one for another so as to redefine the above expression as a transformation matrix $[k_{inv}(1) \ k_{inv}(2) \ k_{inv}(3) \ k_{inv}(4)]$ for distortion correction of [k1 k2 k3 k4]T. Thus, having the left side of the expression multiplied by a pseudo inverse matrix of the (n×4) matrix on the right side enables estimation of the parameter $k_{inv}$ as defined by the following expression (16).

[Math. 16]

$$k_{inv}=[k_{inv(1)}k_{inv(2)}k_{inv(3)}k_{inv(4)}]^T \quad (16)$$

The points (pixels) for use in the estimation are to be a sufficient number of points sampled at equal intervals longitudinally and crosswise over the entire image. The lens distortion factor k in the direction of the distorted two-dimensional image (in the direction of re-projection) is to be given an appropriate initial value, such as a representative value generated from an average of the calibration values of multiple projection apparatuses 112 (projectors) and imaging apparatuses 113 (cameras).

Further, correcting the lens distortion using the parameter $k_{inv}$ requires tracking inversely the above-described distortion processing. Given the coordinates x',y' including the distortion, a distortion-corrected angle of view θ' is obtained as defined by the following expressions (17) and (18).

[Math. 17]

$$r'^2 = x'^2 + y'^2 \quad (17)$$

[Math. 18]

$$\theta' = r'(1+k_{inv(1)}r'^2+k_{inv(2)}r'^4+k_{inv(3)}r'^6k_{inv(4)}r'^8) \quad (18)$$

Then the homogeneous coordinates a,b corresponding to the angle of view θ' are obtained as defined by the following expressions (19) and (20).

[Math. 19]

$$a = (\tan \theta'/r')x' \quad (19)$$

[Math. 20]

$$b = (\tan \theta'/r')y' \quad (20)$$

This makes it possible to correct the coordinates including the distortion into the distortion-free coordinates.

<Flow of the Parameter Estimation Process>

Figure 8:
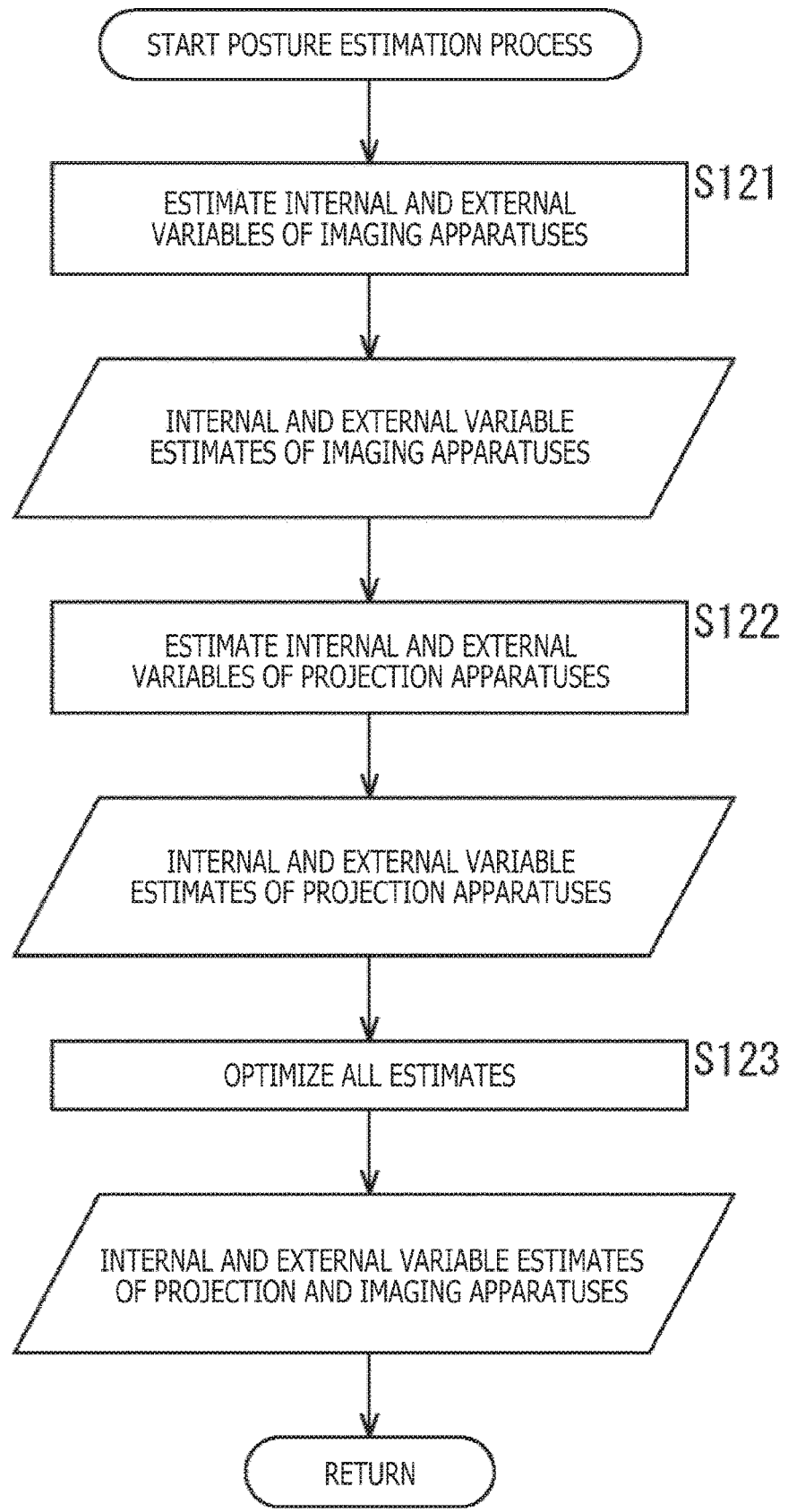
FIG. 8 is a flowchart explaining a typical flow of a posture estimation process.
Figure 9:
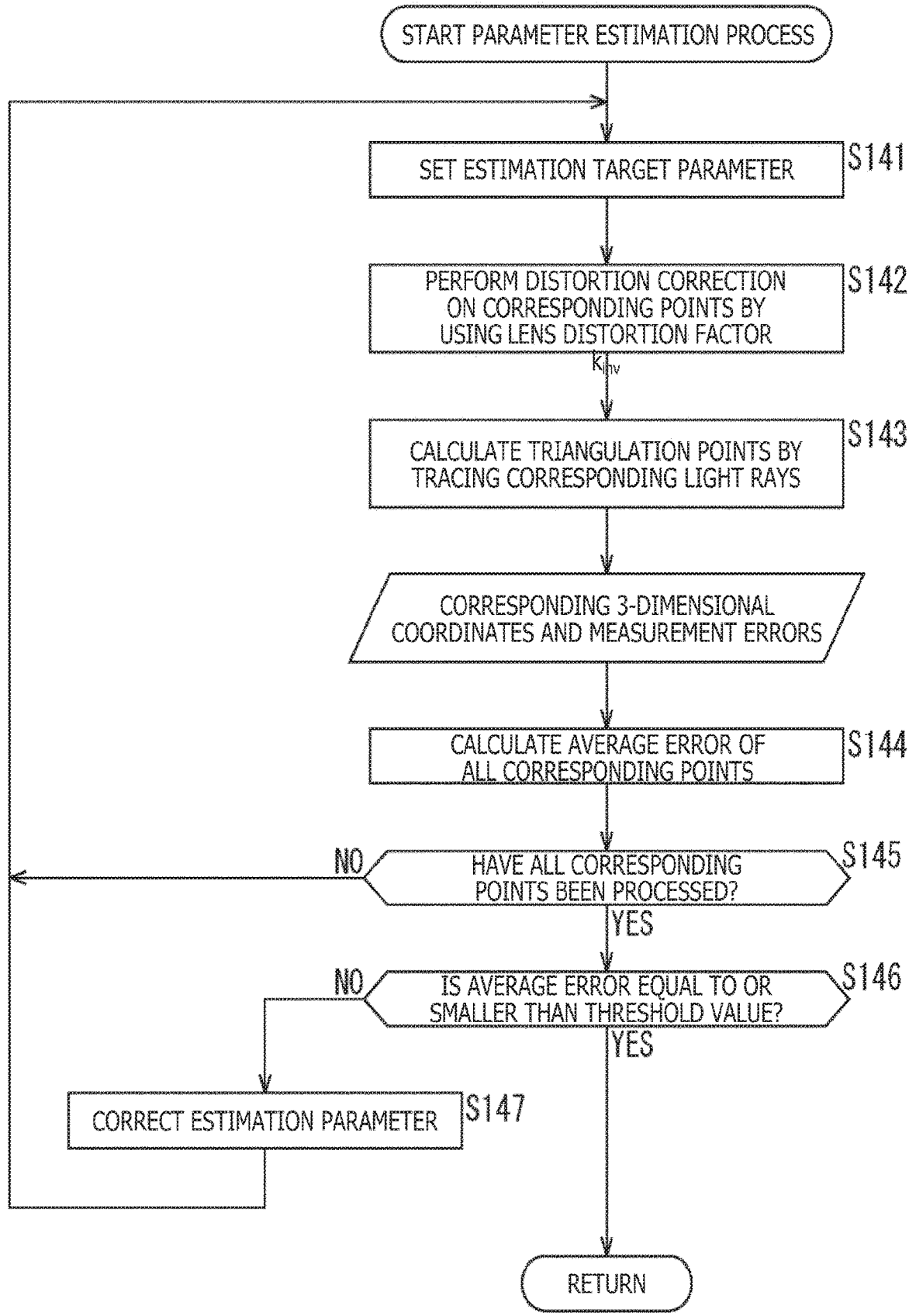
FIG. 9 is a flowchart explaining a typical flow of a parameter estimation process.

In steps S121 and S122 of FIG. 8, the parameter $k_{inv}$ corresponding to inverse transformation of the lens distortion factor is re-estimated. The re-estimation is implemented by nonlinear optimization that involves minimizing the distance between corresponding light rays (triangulation error) obtained from the pixel-to-pixel correspondence between the projection apparatus 112 and the imaging apparatus 113. A typical flow of the parameter estimation process constituted by steps S121 and S122 in FIG. 8 is explained below with reference to the flowchart of FIG. 9. As the algorithm for nonlinear optimization, the Levenberg-Marquardt method may be used, for example.

When the parameter estimation process is started, the imaging variable estimation section 261 (or projection variable estimation section 262) sets, for example, the parameter $k_{inv}$ as an estimation target parameter in step S141. Here, any internal or external variable other than the parameter $k_{inv}$ may be designated instead. Further, multiple parameters may be designated at the same time.

In step S142, the imaging variable estimation section 261 (or projection variable estimation section 262) performs distortion correction on each corresponding point by using the parameter $k_{inv}$ corresponding to inverse transformation of the lens distortion factor.

With the present method, as discussed above, the three-dimensional space is regarded as a distortion-free ideal space, and the captured or projected image is defined to include distortion caused by the fθ lens. That is, previously acquired pixel-to-pixel correspondence between the projection apparatus 112 and the imaging apparatus 113 has been obtained as the corresponding relations between the image coordinates of pixels each including distortion. Thus, in order to perform a ray trace in the three-dimensional space on the basis of the corresponding relations, it is necessary to use distortion-free image coordinates.

Figure 10:
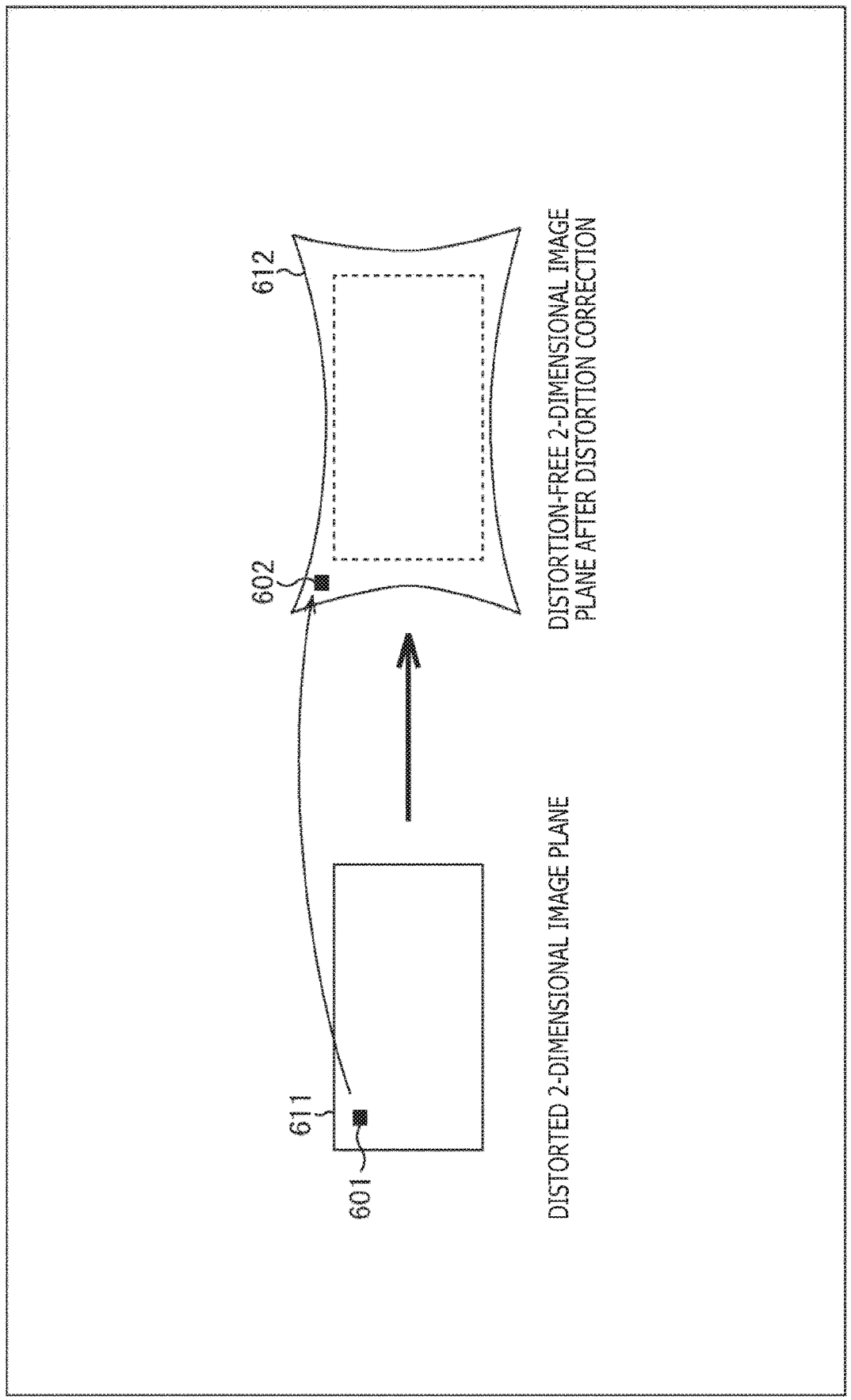
FIG. 10 is a view depicting how distortion is typically corrected.

In view of the above, a corresponding pixel 601 in an image 611 on a two-dimensional plane such as the one depicted on the left in FIG. 10 is subjected to distortion correction using the parameter $k_{inv}$ and the above-described expressions (7) to (11). An image coordinate value (corresponding pixel 602) is thus obtained in a distortion-free image 612 whose range is made wider than the initial rectangle due to the effect of the fθ lens, as depicted on the right in FIG. 10. This distortion correction is carried out on each of the corresponding pixels.

Figure 11:
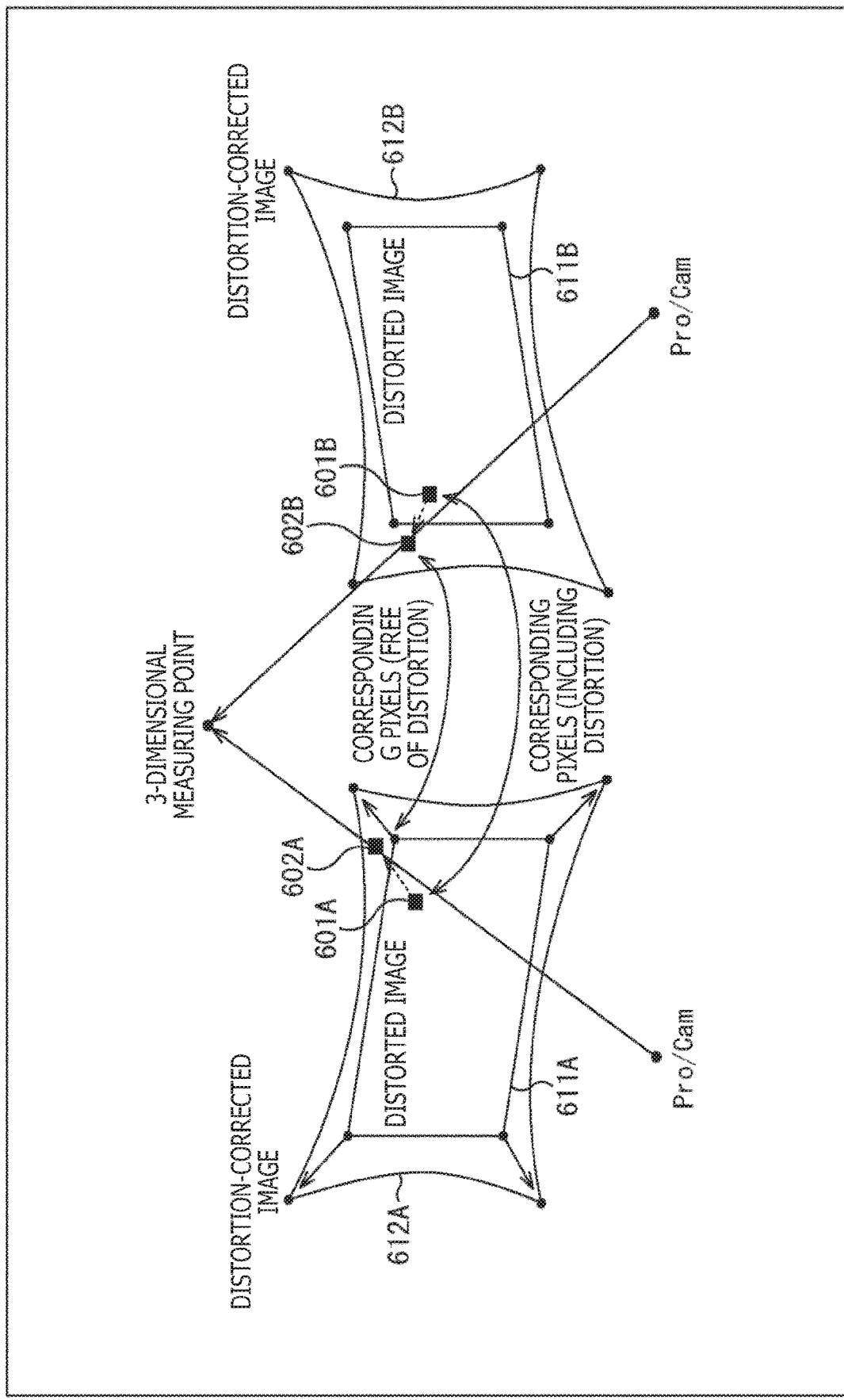
FIG. 11 is a view depicting how a ray trace is typically performed with distortion taken into consideration.

In step S143, the imaging variable estimation section 261 (or projection variable estimation section 262) calculates (approximates) triangulation points by tracing corresponding light rays. The light rays corresponding to a pixel can be traced by projecting distortion-free image coordinates in the direction of the three-dimensional space, by using the relations of the expressions (10) and (11) above. That is, as depicted in FIG. 11, the distortion correction transforms a corresponding pixel 601A in a distorted two-dimensional plane image 611A to a corresponding pixel 602A in an image 612A. Likewise, the distortion correction transforms a corresponding pixel 601B in a distorted two-dimensional plane image 611B to a corresponding pixel 602B in an image 612B. In this manner, the corresponding pixels between the projection apparatus 112 and the imaging apparatus 113 are corrected for distortion and subjected to projection to obtain light rays of which the intersection point is measured as the three-dimensional point corresponding to the pixel.

At this time, the distance between the light rays corresponding to a triangulation point is regarded as an error between the corresponding light rays (i.e., triangulation error). In the case where the error is zero, that means the corresponding light rays intersect with each other at one point in the three-dimensional space. After the three-dimensional coordinates of each corresponding point (also referred to as corresponding three-dimensional coordinates) and the concomitant measurement error have been obtained in this manner, the process advances to step S144.

In step S144, the imaging variable estimation section 261 (or projection variable estimation section 262) calculates an average error of the entire corresponding points on the basis of the measurement errors obtained in the processing of step S143.

In step S145, the imaging variable estimation section 261 (or projection variable estimation section 262) determines whether or not all corresponding points have been processed. In the case where an unprocessed corresponding point is determined to exist, the process returns to step S141 and the subsequent steps are repeated. That is, steps S141 to S145 are carried out on each of the corresponding points. Then, in the case where it is determined in step S145 that all corresponding points have been processed, the process advances to step S146.

In step S146, the imaging variable estimation section 261 (or projection variable estimation section 262) determines whether or not the average error calculated in step S144 is equal to or smaller than a predetermined threshold value. In the case where the average error is determined to be larger than the predetermined threshold value, the process advances to step S147.

In step S147, the imaging variable estimation section 261 (or projection variable estimation section 262) corrects the estimation parameters (e.g., parameter $k_{inv}$ and other parameters). Note that in order to achieve highly accurate estimation, the corresponding points of which the errors are very large are to be removed as needed by each processing block so that these points will not be used for the estimation. Upon completion of the processing in step S147, the process returns to step S141 and the subsequent steps are repeated. That is, the processing in step S141 to step S147 is repeated until the average error of the entire corresponding points is optimized to be equal to or smaller than the predetermined threshold value.

Further, in the case where it is determined in step S146 that the average error is equal to or smaller than the predetermined threshold value and that the parameters have been optimized, the parameter estimation process is terminated. The process then returns to the flowchart of FIG. 8.

Figure 12:
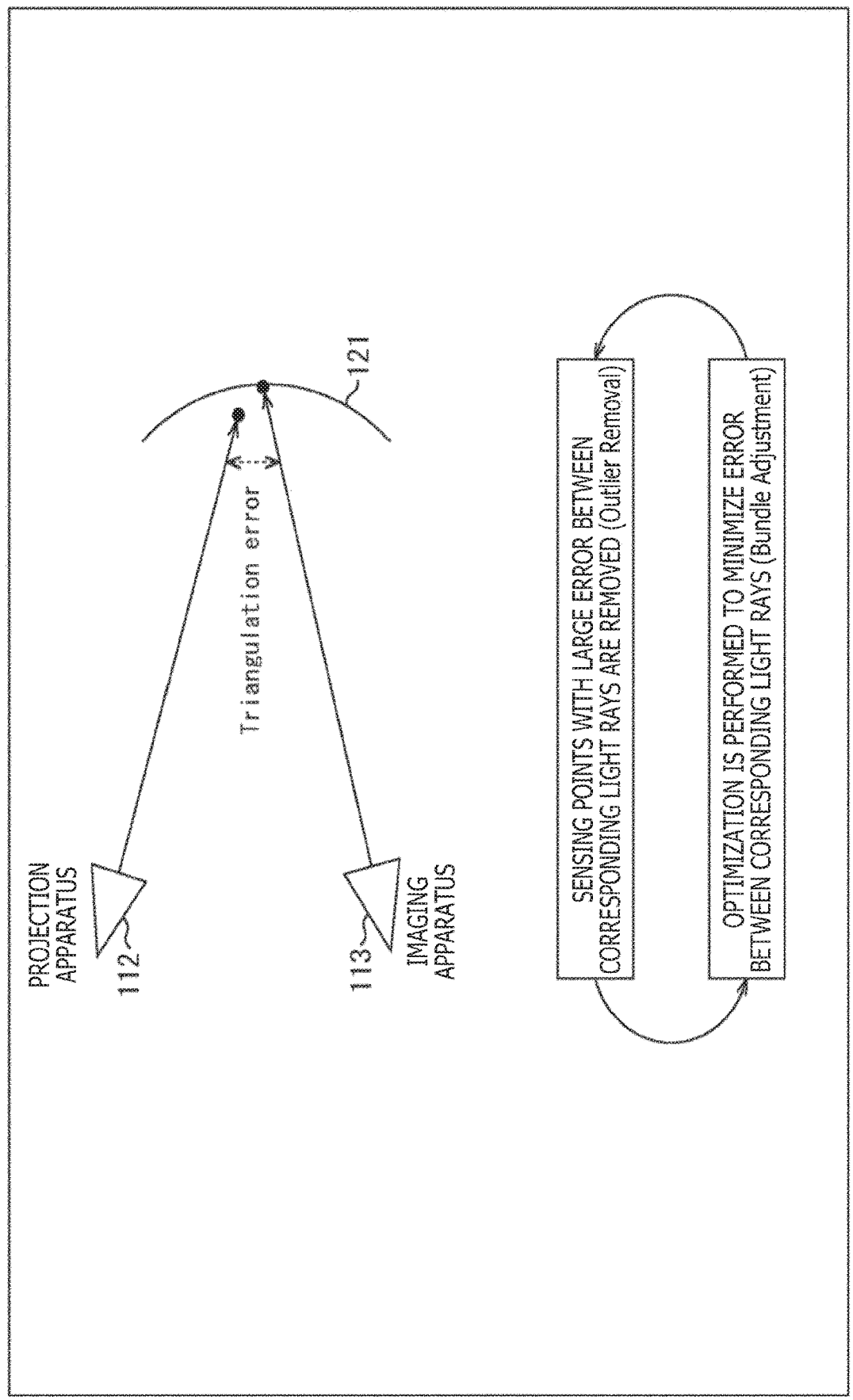
FIG. 12 is a view depicting how posture estimation is typically performed.

That is, outliers are removed so that the points outside the screen 121 or the points of low sensing accuracy will not be used for the estimation. For example, as depicted in the upper part of FIG. 12, an error between corresponding light rays from the projection apparatus 112 and imaging apparatus 113 is obtained at the time of finding a triangulation point. Then, as illustrated in the lower part of FIG. 12, the optimization for minimizing the error between the corresponding light rays and the removal of the sensing points with very large errors between the corresponding light rays are repeated. This enables still more accurate estimation of the internal and external variables in the case where highly accurate information regarding the corresponding points has been obtained from the sensing process.

Note that in the total optimization in step S123 of FIG. 8, the parameters are optimized basically in a similar manner. It is to be noted, however, that during the total optimization, the process of updating all projection and imaging variables estimated as described above is repeated while the parameters targeted for the estimation are changed one after another.

When the posture estimation process and the parameter estimation process are performed as described above, it is possible to achieve highly accurate, automated projection correction by precisely estimating the lens distortion factor during automatic calibration of the projection imaging system 100 that includes the projection apparatuses 112 and imaging apparatuses 113 each using the fish-eye lens (fθ lens) highly susceptible to the effect of lens distortion.

<Flow of the Geometric Correction Process>

Figure 13:
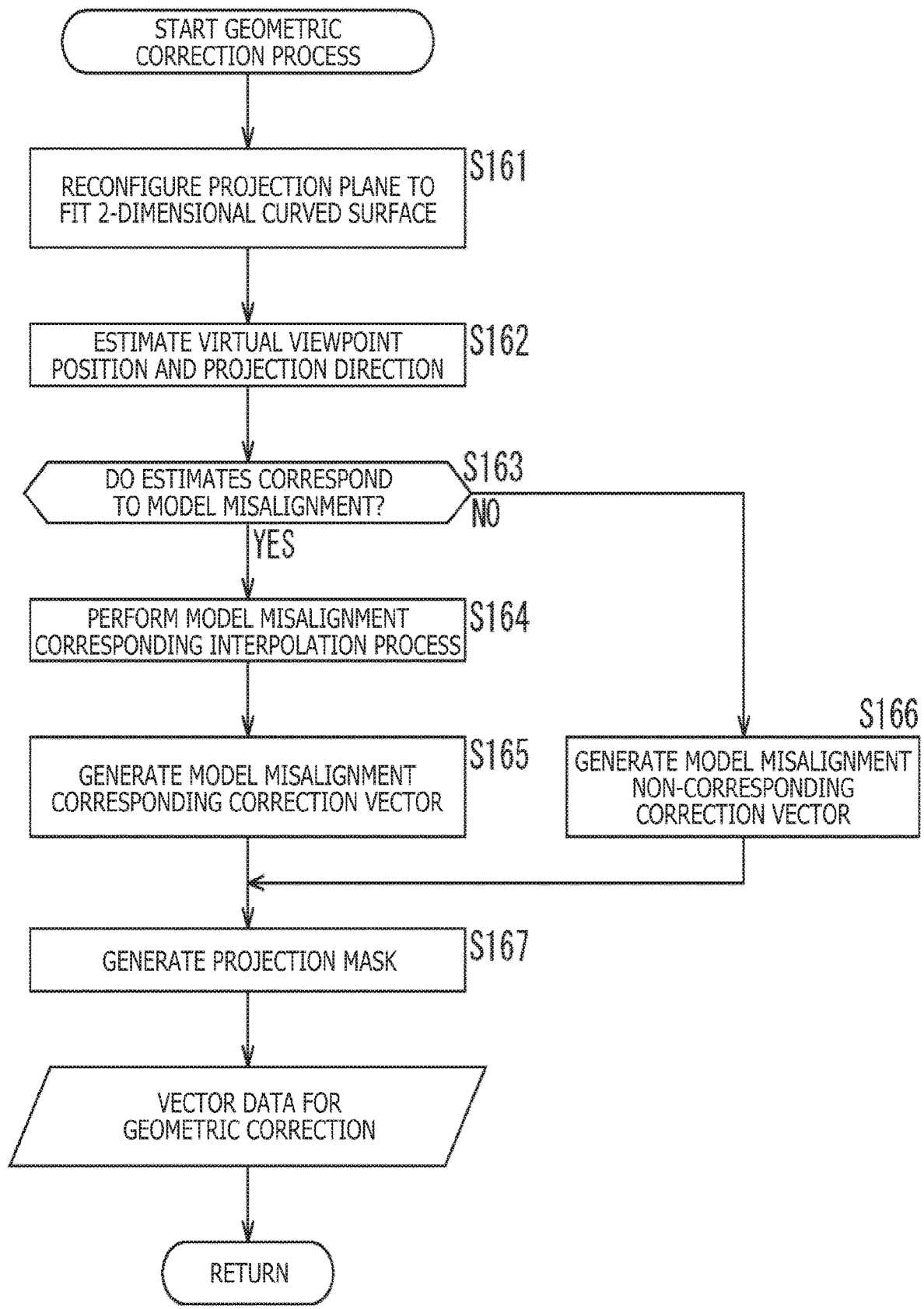
FIG. 13 is a flowchart explaining a typical flow of a geometric correction process.

Explained next with reference to the flowchart of FIG. 13 is a typical flow of the geometric correction process performed in step S103 of FIG. 6.

When the geometric correction process is started, the projection plane modeling section 271 in the geometric correction section 253 reconfigures in step S161 the projection plane by using the parameters related to posture estimation of the projection apparatuses 112 and imaging apparatuses 113, thereby fitting a two-dimensional curved surface.

Figure 14:
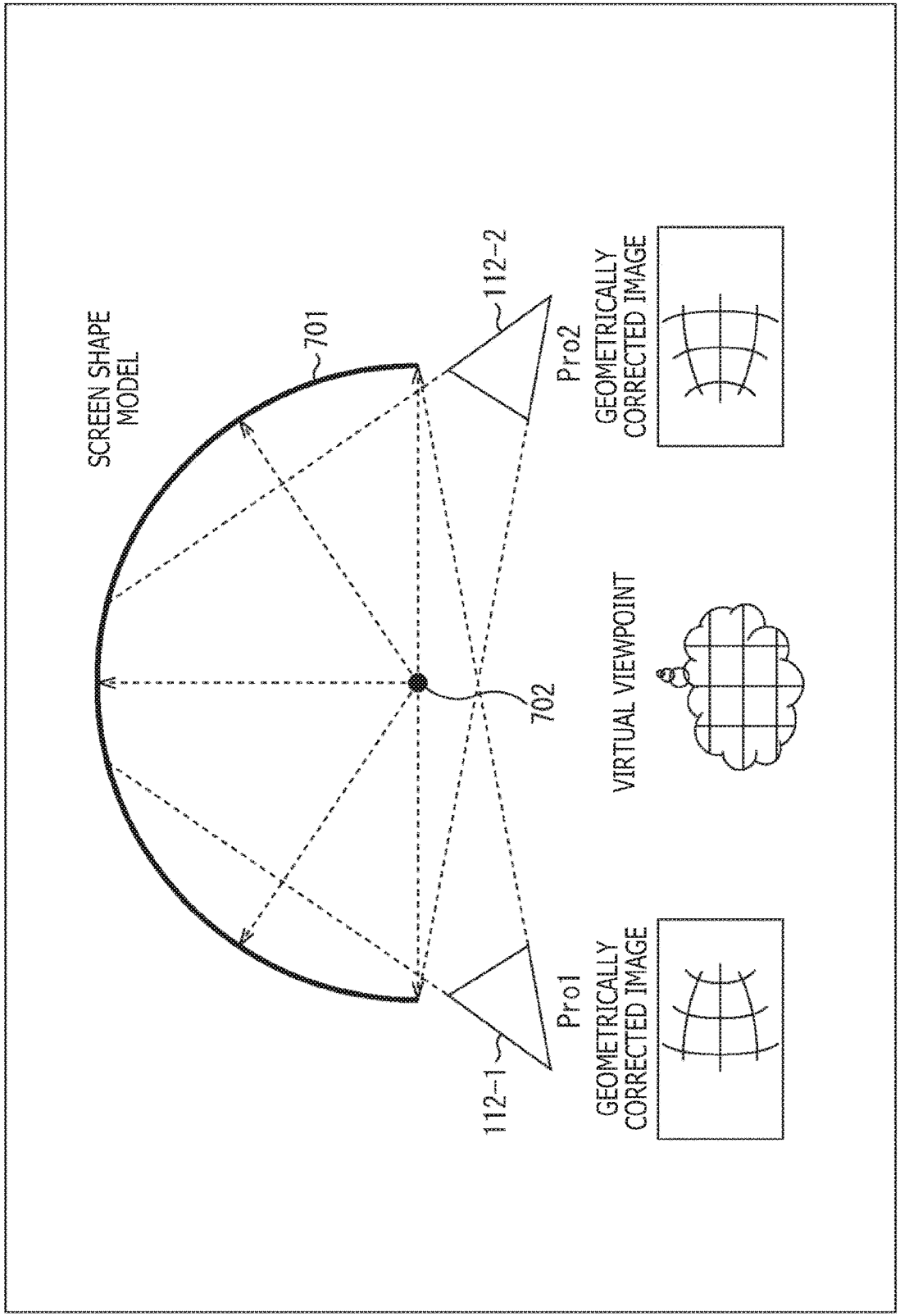
FIG. 14 is a view depicting how geometric projection correction is typically performed with respect to a virtual viewpoint.

In step S162, the virtual viewpoint position/projection direction estimation section 272 estimates a virtual viewpoint position and a direction of image projection relative to that virtual viewpoint position. For example, suppose that the processing in step S161 has set a screen shape model 701 as illustrated in FIG. 14. Then, the virtual viewpoint position/projection direction estimation section 272 sets a virtual viewpoint 702 at the front of the screen shape model 701 and establishes a projection direction (in front) relative to the virtual viewpoint 702.

Figure 15C:
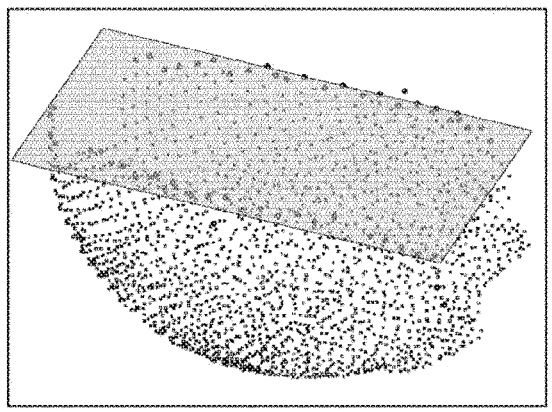
FIGS. 15A, 15B, and 15C are views depicting how a virtual viewpoint is typically set.
Figure 15B:
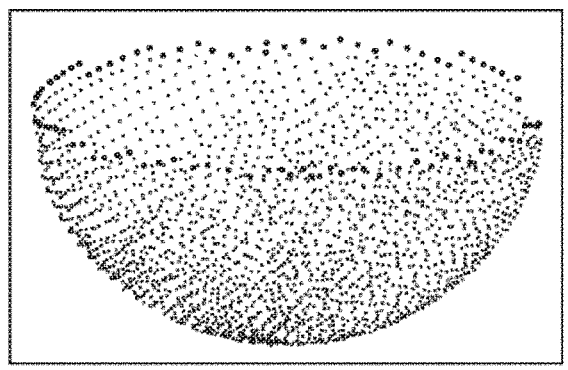
Figure 15A:
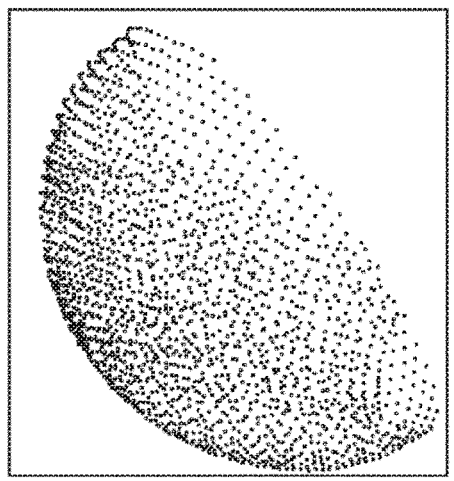

In order to project an image from the virtual viewpoint 702 to the screen shape model 701 in a geometrically accurate manner, it is necessary to determine the front, horizontal, and vertical directions of the virtual viewpoint 702. Thus, to determine the front direction, the virtual viewpoint position/projection direction estimation section 272 selects, from a group of three-dimensional points measured as depicted in FIG. 15A, a group of points corresponding to the edge of the screen 121 as illustrated in FIG. 15B. The virtual viewpoint position/projection direction estimation section 272 further fits the selected group of points to a plane as pictured in FIG. 15C. A normal direction to that plane is regarded as the front direction as viewed from a viewpoint camera. Further, because the projection apparatuses 112-1 and 112-2 are generally arranged approximately at the same height, the horizontal direction is determined on the basis of that height of the projection apparatuses 112. The vertical direction is finally determined as a vector that is at right angles to the other two directions. Such estimation of the virtual viewpoint direction and of the projection direction is automatically performed using measurement information. There is no need to designate the direction explicitly and manually.

The above processing allows the virtual viewpoint direction and the projection direction to be estimated. Thus, on the assumption that the screen 121 is positioned in front of the virtual viewpoint position, a geometric correction vector can be generated in such a manner as to permit viewing of the image from that position in a geometrically accurate manner.

In step S163, the model misalignment corresponding processing section 273 determines whether or not the estimates correspond to model misalignment. In the case where it is determined that there is misalignment between the projection plane and its model (model misalignment) and that the estimates correspond to model misalignment, the process advances to step S164.

In step S164, the model misalignment corresponding processing section 273 performs a model misalignment corresponding interpolation process. In the reconfiguration of the projection plane in step S161, as depicted in FIG. 16A, three-dimensional points 721 on the projection plane are measured using the information regarding the corresponding points between the projection apparatus 112 and the imaging apparatus 113 and the internal and external variable estimates of these apparatuses. Then, as illustrated in FIG. 16B, this group of measured three-dimensional points is fitted with the screen shape model 701 of a two-dimensional curved surface (e.g., ellipsoid, hyperboloid, or cylinder) such as to minimize the least-square error. In the case of a spherical surface screen, the points are usually modeled as an ellipsoid. This provides smooth, noise-resistant geometric correction through calculation of the geometric correction vector based on the model estimated from the whole pixels.

Figure 17:
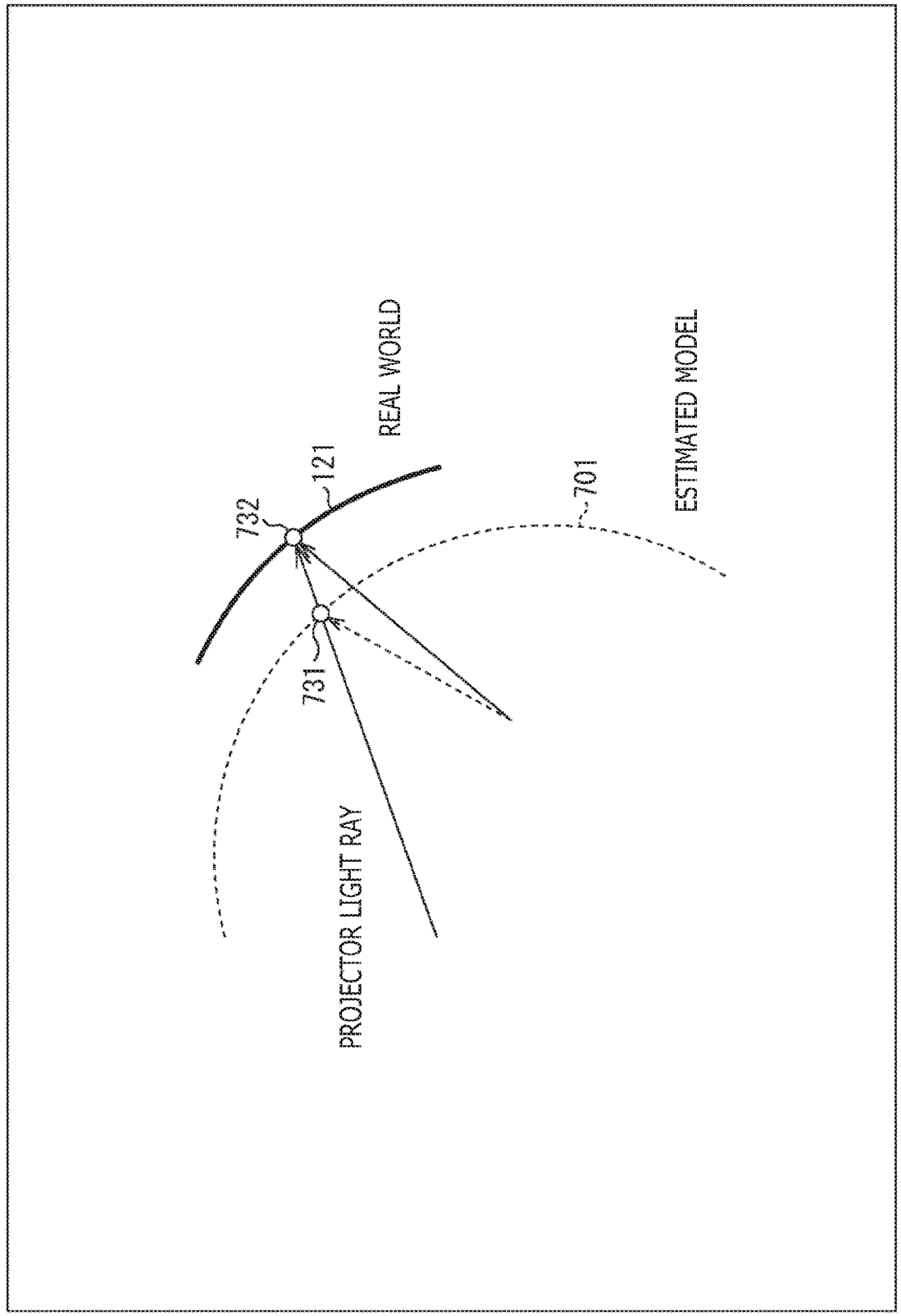
FIG. 17 is a view depicting how model misalignment typically takes place.

It is to be noted, however, that the model-based geometric correction can entail an error of the screen shape when the shape is measured as three-dimensional points deviating, due to distortion, for example, from the model estimated as depicted in FIG. 17. In the example of FIG. 17, a three-dimensional point 731 measured on the estimated screen shape model 701 is found deviating from a three-dimensional point 732 that ought to be measured on the actual (real-world) screen 121.

Figure 18:
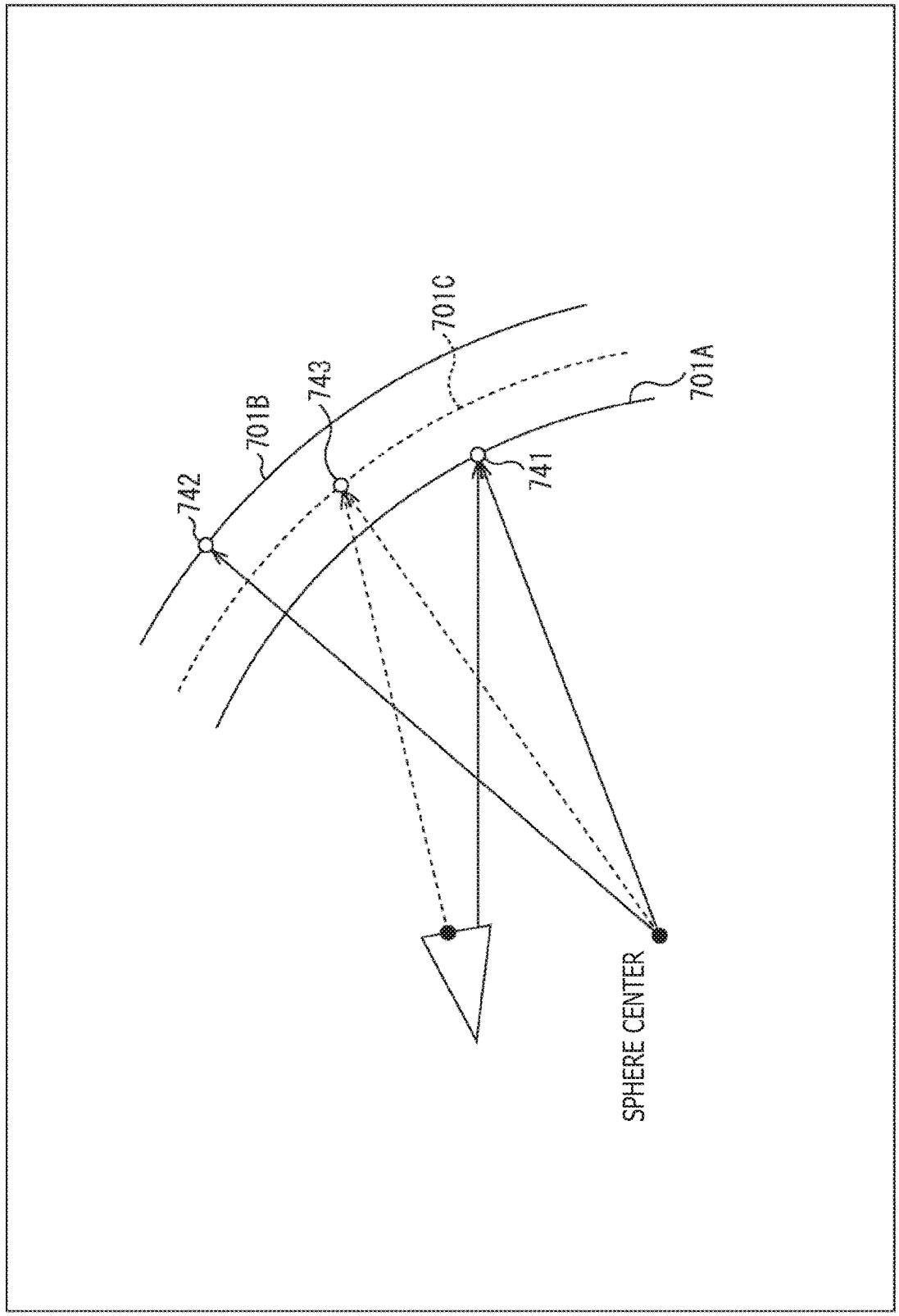
FIG. 18 is a view depicting how a model misalignment corresponding process is typically performed.

Thus, as illustrated in FIG. 18, the geometric correction vector is generated from the position of an intersection point on a model with its radius set by the sphere center of a virtually arranged spherical model and an interpolated value of distances of triangulation points. That is, in the example of FIG. 18, a three-dimensional point 741 on a screen shape model 701A and a three-dimensional point 742 on a screen shape model 701B are measured as the triangulation points. A three-dimensional point 743 is then interpolated between these three-dimensional points (i.e., an assumed intersection point on a screen shape model 701C with its radius interpolated relative to the sphere center). The three-dimensional point 743 is then used to generate the geometric correction vector.

In this manner, it is possible to implement smooth correction even on those model misalignment portions of the actual screen 121 that are not aligned with the ideal model (i.e., screen shape model 701).

Then, in step S165, the model misalignment corresponding processing section 273 generates a correction vector corresponding to the model misalignment (also called the model misalignment corresponding correction vector). Upon completion of the processing in step S165, the process advances to step S167.

In addition, in the case where it is determined in step S163 that the estimates do not correspond to model misalignment, the process advances to step S166. In step S166, the model misalignment corresponding processing section 273 generates a correction vector not corresponding to the model misalignment (also called the model misalignment non-corresponding correction vector). Upon completion of the processing in step S166, the process advances to step S167.

In step S167, the projection mask generation section 274 generates a projection mask such as to limit the range of image projection to an area inside the screen 121 (i.e., the projected image does not protrude from the screen 121 (confined within the screen 121)). The projection mask generation section 274 outputs geometric correction vector data including the correction vector generated in step S165 or S166 and the projection mask generated in step S167. Upon completion of the processing in step S167, the geometric correction process is terminated. The process then returns to the flowchart of FIG. 6.

By performing the above processes as described, the control apparatus 111 implements correction of projection to the dome-type screen 121 for use with multiple projection apparatuses 112 each using the fθ lens, by means of a three-dimensional approach using the projection imaging system 100.

In this case, images are corrected on the basis of a two-dimensional curved surface model built on three-dimensional information representative of a screen shape. The processing thus guarantees the geometric accuracy of images, such as a straight line being seen as a correct straight line. Further, in the projection imaging system 100 having a fish-eye (equidistant projection) optical assembly, the processing easily enables the steps ranging from calibration of the internal and external variables of the projection apparatuses 112 and imaging apparatuses 113 to projection correction, the steps not having been dealt with successfully by the methods involving the use of a projector-camera system based on the existing perspective projection optical assembly.

Also, it is not necessary to perform preliminary estimation (preliminary calibration) of part or all of the internal and external variables of each of the projection and imaging apparatuses, as opposed to the three-dimensional approach involving ordinary projection imaging systems requiring such preliminary estimation.

Moreover, geometrically accurate correction is implemented with respect to an established virtual viewpoint without the imaging apparatus 113 being arranged in the position desired to be the viewpoint. Further, from the virtual viewpoint, projection is performed to the screen 112 in an appropriate projection direction with suitable up-down/left-right image orientation maintained. Further, the projected image is corrected in a geometrically accurate manner relative to the front of the screen 121 on the basis of the information obtained with projection and imaging by the projection apparatus 112 and imaging apparatus 113 not in front of the screen 121 but from the side thereof.

Also, as described above, the parameter $k_{inv}$ corresponding to inverse transformation of the lens distortion factor of the projection apparatuses 112 is introduced in parameter estimation, the parameter $k_{inv}$ being used to uniformly correct the pixels for distortion. This eliminates the need for compensating each of the pixels with use of the lens distortion factor k.

Further, ray traces are performed by correcting the pixels of a distorted image for distortion and by projecting the pixels onto a distortion-free image. Thus, the optimization for minimizing the distance between corresponding light rays achieves re-estimation of the internal and external variables of the projection apparatuses 112 and imaging apparatuses 113 including the parameter $k_{inv}$.

In addition, some of the internal parameters of the projection apparatuses 112 and imaging apparatuses 113 need only be given sufficiently appropriate initial values (e.g., averages of calibration values). This still provides calibration of the whole internal and external variables of the projection apparatuses 112 and imaging apparatuses 113 that are arranged before the screen without recourse to preliminary calibration procedures for each of the apparatus enclosures.

It has been explained above that the control apparatus 111 estimates the internal and external variables of each of the projection apparatuses 112 and imaging apparatuses 113. However, the present method is not limited to the foregoing examples. Alternatively, the control apparatus 111 may estimate the internal and external variables of either the projection apparatuses 112 or the imaging apparatuses 113. In such a case, the internal and external variables of the remaining apparatuses may be determined beforehand or may be estimated by the other apparatuses.

As another alternative, the control apparatus 111 may estimate either the internal variables or the external variables. In such a case, the other variables may be determined beforehand or may be estimated by the other apparatuses.

That is, the control apparatus 111 need only estimate at least either the internal variables or the external variables of either the projection apparatuses 112 or the imaging apparatuses 113.

3. Second Embodiment

<Other Configurations>

Note that the configuration of the imaging system to which the present technology is applied is not limited to the above-described example in FIG. 1. For example, the control apparatus 111, the projection apparatus 112, and the imaging apparatus 113 may be provided in desired numbers. The control apparatus 111 may, for example, be provided in plural numbers. There may be three or fewer, or five or more projection apparatuses 112 and three or fewer, or five or more imaging apparatuses 113. Also, the projection apparatus 112 and the imaging apparatus 113 need not be provided in equal numbers.

Further, it has been explained above that the projection apparatuses 112 and the imaging apparatuses 113 are connected with the control apparatus 111 via the cables 115. Alternatively, these apparatuses may be interconnected in any other suitable manner as long as they can communicate with each other. For example, the control apparatus 111 may communicate with the projection apparatuses 112 and imaging apparatuses 113 by wire or wirelessly, or in both wired and wireless fashion. As another alternative, the control apparatus 111, the projection apparatuses 112, and the imaging apparatuses 113 may be interconnected communicably via any suitable communication network.

Any suitable method of communication may be adopted for that network. For example, the method may be wired communication or wireless communication, or both. The network may include a single or multiple communication networks. For example, this network may include the Internet, public telephone networks, mobile broadband networks such as what is generally called the 3G or 4G networks, WAN (Wide Area Network), LAN (Local Area Network), wireless communication networks for communication based on the Bluetooth (registered trademark) standard, communication channels for short-range wireless communication such as NFC (Near Field Communication), communication channels for infrared ray communication, wired communication networks based on such standards as HDMI (High-Definition Multimedia Interface; registered trademark) and USB (Universal Serial Bus), or any other communication networks and communication channels based on any suitable communication standards.

Figure 19A:
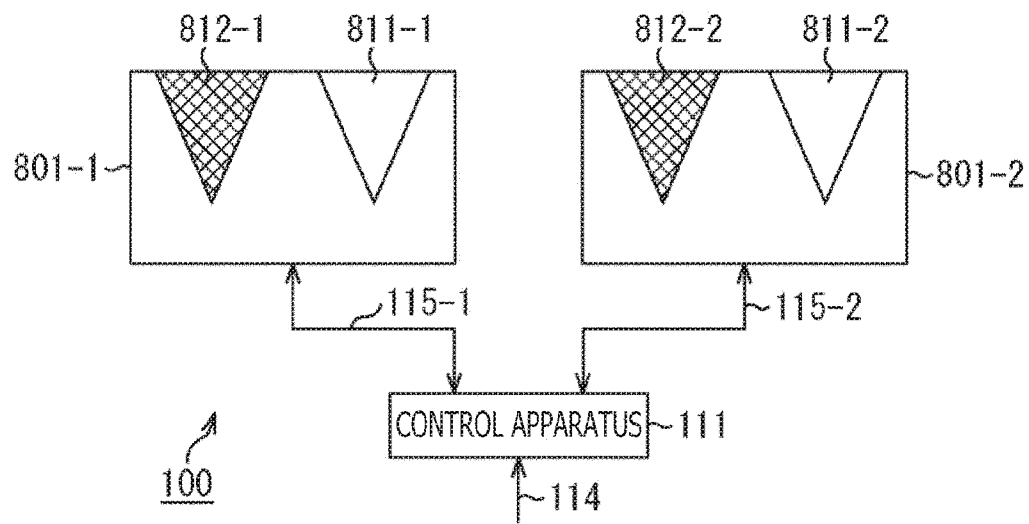
FIGS. 19A, 19B, and 19C are block diagrams depicting another configuration example of the projection imaging system.

Also, the projection apparatus 112 and the imaging apparatus 113 may be integrated into a single apparatus. For example, as depicted in FIG. 19A, the projection imaging system 100 may include a projection imaging apparatus 801-1, a projection imaging apparatus 801-2, and a control apparatus 111.

The projection imaging apparatus 801-1 includes a projection section 811-1 and an imaging section 812-1. The projection section 811-1 has functions similar to those of the projection apparatus 112-1 in FIG. 1. Also, the imaging section 812-1 has functions similar to those of the imaging apparatus 113-1 in FIG. 1. That is, the projection imaging apparatus 801-1 has the functions of the projection apparatus 112-1 and imaging apparatus 113-1.

Likewise, the projection imaging apparatus 801-2 includes a projection section 811-2 and an imaging section 812-2. The projection section 811-2 has functions similar to those of the projection apparatus 112-2 in FIG. 1. Also, the imaging section 812-2 has functions similar to those of the imaging apparatus 113-2 in FIG. 1. That is, the projection imaging apparatus 801-2 has the functions of the projection apparatus 112-2 and imaging apparatus 113-2.

The control apparatus 111 is communicably connected with the projection imaging apparatus 801-1 via the cable 115-1. The communication allows the control apparatus 111 to control the projection imaging apparatus 801-1. Thus controlled, the projection imaging apparatus 801-1 is supplied with an image, projects the image to the projection plane, and captures a projected image on the projection plane for image acquisition. The control apparatus 111 is also connected communicably with the projection imaging apparatus 801-2 via the cable 115-2. The communication allows the control apparatus 111 to control the projection imaging apparatus 801-2. Thus controlled, the projection imaging apparatus 801-2 is supplied with an image, projects the image to the projection plane (e.g., screen 121), and captures a projected image on the projection plane for image acquisition.

That is, in this case as well, the projection imaging system 100 can perform image projection correction by use of the present technology and in a manner similar to the case in FIG. 1.

Note that the projection imaging apparatuses 801-1 and 801-2 are referred to as the projection imaging apparatus 801 in the case where there is no need for their individual explanation. Also, the projection sections 811-1 and 811-2 are referred to as the projection section 811 where there is no need for their individual explanation. Further, the imaging sections 812-1 and 812-2 are referred to as the imaging section 812 where there is no need for their individual explanation.

As in the case in FIG. 1, the projection imaging apparatus 801 may be provided in desired numbers. For example, three or more projection imaging apparatuses 801 may be provided. Further, there may be provided one or more projection sections 811 and one or more imaging sections 812 in the projection imaging apparatus 801; the projection section 811 and the imaging section 812 may be provided in different numbers. Moreover, each of the projection imaging apparatuses 801 may include different numbers of the projection sections 811 and imaging sections 812. Further, the projection imaging system 100 may include the projection imaging apparatus 801 and either the projection apparatus 112 or the imaging apparatus 113, or the projection imaging apparatus 801 and both the projection apparatus 112 and the imaging apparatus 113 in a mixed manner.

Figure 19B:
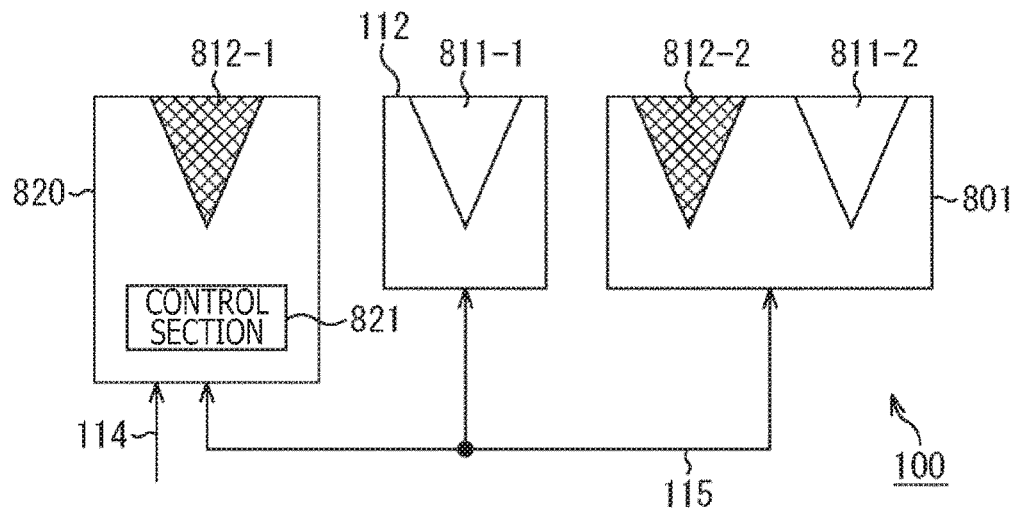

Further, the control apparatus 111 may be integrated with another apparatus. For example, as depicted in FIG. 19B, the projection imaging system 100 may include an imaging apparatus 820, a projection apparatus 112, and a projection imaging apparatus 801.

The imaging apparatus 820 includes the imaging section 812-1 and a control section 821. The control section 821 has functions similar to those of the control apparatus 111 in FIG. 1 or in FIG. 19A. That is, the imaging apparatus 820 has the functions of the imaging apparatus 113 and the control apparatus 111. The imaging apparatus 820, the projection apparatus 112, and the projection imaging apparatus 801 are connected communicably with each other via the cable 115.

Images are thus supplied to the imaging apparatus 820 via the cable 114. The control section 821 in the imaging apparatus 820 controls, via the cable 115, the projection section 811-1 in the projection apparatus 112 and the projection section 811-2 in the projection imaging apparatus 801 to project the supplied image to the projection plane (e.g., screen 121). The control section 821 further controls the imaging section 812-1 as well as the imaging section 812-2 in the projection imaging apparatus 801 via the cable 115 to capture the projected image on the projection plane. At this time, the control section 821 performs geometric correction on the image by using the present technology so that a geometrically corrected image will be projected.

That is, also in this case, the projection imaging system 100 can perform image projection correction by use of the present technology and in a manner similar to the case in FIG. 1.

Note that the control apparatus 111 may be integrated with an apparatus other than the imaging apparatus 113, such as with the projection apparatus 112 or the projection imaging apparatus 801. That is, the apparatus that includes the control section 821 may be configured in any suitable manner and may have the projection sections 811 and imaging sections 812 in desired numbers. Also, there may be one or multiple apparatuses each having the control section 821. Further, in the projection imaging system 100, the constituent elements other than the apparatus having the control section 821 may be configured as desired. The configuration of the projection imaging system 100 is thus not limited to that of the example in FIG. 19B.

Furthermore, the entire configuration of the projection imaging system 100 may be integrated into a single apparatus. For example, as depicted in subfigure FIG. 19C, the whole system may be integrated into a projection imaging apparatus 830. In the example in FIG. 19C, the projection imaging apparatus 830 includes a projection section 811-1, a projection section 811-2, an imaging section 812-1, an imaging section 812-2, and a control section 821. That is, the projection imaging apparatus 830 is configured in a manner similar to the projection imaging system 100 in FIG. 1. As described above, the present technology may be applied internally to the projection imaging apparatus 830.

Figure 19C:
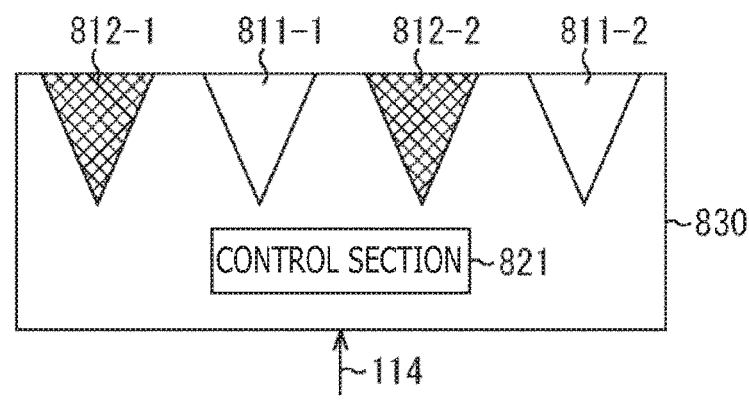

Obviously, the projection imaging apparatus 830 may be configured as desired and the configuration is not limited to that of the example in FIG. 19C. For example, the control section 821, the projection section 811, and the imaging section 812 may each be provided in desired numbers.

4. Notes

<Software>
The series of the processes described above may be executed either by hardware or by software. In the case where these processes are to be carried out by software, the programs constituting the software are installed from a network or from a recording medium.

In the case of the control apparatus 111 in FIG. 2, for example, its recording medium is constituted by the removable media 221 on which the programs are recorded and which are distributed to users apart from the apparatus in order to deliver the recorded programs. In such a case, for example, a piece of the removable media 221 on which the programs are recorded may be attached to the drive 215 so as to have the programs installed into the storage section 213 following their retrieval from the attached piece of removable media 221.

As another example, in the case of the projection apparatus 112 in FIG. 4, its recording medium is constituted by the removable media 321 on which the programs are recorded and which are distributed to users apart from the apparatus in order to deliver the recorded programs. In such a case, for example, a piece of the removable media 321 on which the programs are recorded may be attached to the drive 315 so as to have the programs installed into the storage section 313 following their retrieval from the attached piece of the removable media 321.

As a further example, in the case of the imaging apparatus 113 in FIG. 5, its recording medium is constituted by the removable media 421 on which the programs are recorded and which are distributed to users apart from the apparatus in order to deliver the recorded programs. In such a case, for example, a piece of the removable media 421 on which the programs are recorded may be attached to the drive 415 so as to have the programs installed into the storage section 413 following their retrieval from the attached piece of removable media 421.

Further, the programs may be offered via wired or wireless transmission media such as local area networks, the Internet, and digital satellite broadcasts. In the case of the control apparatus 111 in FIG. 2, for example, the programs may be received by the communication section 214 and installed into the storage section 213. Further, in the case of the projection apparatus 112 in FIG. 4, for example, the programs may be received by the communication section 314 and installed into the storage section 313. Further, in the case of the imaging apparatus 113 in FIG. 5, for example, the programs may be received by the communication section 414 and installed into the storage section 413.

Otherwise, the programs may be preinstalled in a storage section or a ROM. In the case of the control apparatus 111 in FIG. 2, for example, the programs may be preinstalled in the storage section 213 or in a ROM (not depicted) inside the control section 201. Further, in the case of the projection apparatus 112 in FIG. 4, for example, the programs may be preinstalled in the storage section 313 or in a ROM (not depicted) inside the control section 301. Further, in the case of the imaging apparatus 113 in FIG. 5, for example, the programs may be preinstalled in the storage section 413 or in a ROM (not depicted) inside the control section 401.

<Targets to which the Present Technology May be Applied>

Further, the present technology may be implemented as any of the components constituting an apparatus or any of the apparatuses configuring a system, such as a processor (e.g., video processor) in the form of a system LSI (Large Scale Integration), a module (e.g., video module) using multiple processors, a unit (e.g., video unit) using multiple modules, and a set (e.g., video set) supplementing a unit with other functions (i.e., as part of the apparatus).

Furthermore, the present technology may also be applied to a network system including multiple apparatuses. For example, the technology may be applied to cloud services that offer image-related (video-related) services to any types of terminals such as computers, AV (Audio Visual) equipment, mobile information processing terminals, and IoT (Internet of Things) devices.

Note that the systems, apparatuses, or processing sections to which the present technology is applied may be used for desired purposes in any types of fields such as transportation, healthcare, crime prevention, agriculture, livestock farming, mining, beauty care, factories, home electric appliances, climate, and nature monitoring.

For example, the present technology may be applied to systems and devices used for offering content for aesthetic or appreciative purposes. As another example, the present technology may be applied to systems and devices for transportation-related purposes such as for monitoring traffic conditions and controlling automated driving. As a further example, the present technology may be applied to systems and devices for security purposes. As an even further example, the present technology may be applied to systems and devices for automated control of machines. As a still further example, the present technology may be applied to systems and devices for use in agriculture and livestock farming. As a yet further example, the present technology may be applied to systems and devices for monitoring the state of nature such as volcanoes, forests and oceans, as well as the state of wildlife. As another example, the present technology may be applied to systems and devices for use in sports.

<Others>

The present technology is not limited to the embodiments discussed above and may be implemented in diverse variations so far as they are within the scope of the appended claims or the equivalents thereof.

For example, the present technology may be implemented as any of the components constituting an apparatus or a system, such as a processor (e.g., video processor) in the form of a system LSI (Large Scale Integration), a module (e.g., video module) using multiple processors, a unit (e.g., video unit) using multiple modules, and a set (e.g., video set) supplementing a unit with other functions (i.e., as part of the apparatus).

Note that in this description, the term "system" refers to an aggregate of multiple components (e.g., apparatuses or modules (parts)). It does not matter whether all components are housed in the same enclosure. Thus, a system may be configured with multiple apparatuses housed in separate enclosures and interconnected via a network, or with a single apparatus in a single enclosure that houses multiple modules.

Further, for example, any configuration explained in the foregoing paragraphs as one apparatus (or processing section) may be divided into multiple apparatuses (or processing sections). Conversely, the configurations explained above as multiple apparatuses (or processing sections) may be unified into one apparatus (or processing section). Also, the configuration of each apparatus (or processing section) may obviously be supplemented with a configuration or configurations other than those discussed above. Furthermore, part of the configuration of an apparatus (or processing section) may be included in the configuration of another apparatus (or processing section), provided the configurations and the workings remain substantially the same for the system as a whole.

As another example, the present technology may be implemented as a cloud computing setup in which a single function is processed cooperatively by multiple networked apparatuses on a shared basis.

As another example, the above-described programs may be executed by any apparatus. In such a case, the apparatus is only required to have necessary functions (e.g., functional blocks) and obtain necessary information for program execution.

Also, each of the steps discussed in reference to the above-described flowcharts may be executed either by a single apparatus or by multiple apparatuses on a shared basis. Further, if a single step includes multiple processes, these processes may be executed either by a single apparatus or by multiple apparatuses on a shared basis. In other words, multiple steps included in a single step may be executed as a process of multiple steps. Conversely, the process explained as made up of multiple steps may be executed as a single step.

Note that the programs executed by the computer may each be processed in such a manner that the processes of the steps describing the program are carried out chronologically, i.e., in the sequence depicted in this description, in parallel with other programs, or in otherwise appropriately timed fashion such as when the program is invoked as needed. That is, the above processes of steps may be carried out in sequences different from those discussed above as long as there is no conflict between the steps. Furthermore, the processes of the steps describing a given program may be performed in parallel with, or in combination with, the processes of other programs.

Note that the multiple techniques discussed in the present description may each be implemented independently of the others as long as there is no inconsistency therebetween. Obviously, any number of these techniques may be implemented in combination. For example, some or all of the techniques discussed in conjunction with one embodiment may be implemented in combination with some or all of the techniques explained in connection with another embodiment. Further, some or all of any of the techniques discussed above may be implemented in combination with another technique not described above.

Note that the advantageous effects stated in the present description are only examples and not limitative of the present technology that may also provide other advantageous effects.

Note that the present disclosure may also be implemented preferably in the following configurations:

(1)
An information processing apparatus including:
a posture estimation section configured such that, by use of an image projection model using a distortion factor of an fθ lens with an image height of incident light expressed by a product of a focal point distance f and an incident angle θ of the incident light, the posture estimation section estimates a posture of a projection section for projecting an image and a posture of an imaging section for capturing a projection plane to which the image is projected.

(2)
The information processing apparatus as stated in paragraph (1) above in which,
by use of the image projection model, the posture estimation section estimates posture-related parameters of at least either the projection section or the imaging section.

(3)
The information processing apparatus as stated in paragraph (2) above, in which
the posture-related parameters include internal parameters of at least either the projection section or the imaging section.

(4)
The information processing apparatus as stated in paragraph (3) above, in which
the internal parameters include at least one of a focal point distance, a principal point, and a parameter corresponding to inverse transformation of the distortion factor regarding either the projection section or the imaging section.

(5)
The information processing apparatus as stated in any one of paragraphs (2) to (4) above, in which
the posture-related parameters include external parameters of at least either the projection section or the imaging section.

(6)
The information processing apparatus as stated in paragraph (5) above, in which
the external parameters include either a rotation matrix or a translation vector with respect to an origin of a world coordinate system of either the projection section or the imaging section.

(7)
The information processing apparatus as stated in any one of paragraphs (2) to (6) above, in which
the posture estimation section
performs image distortion correction on the projection section and the imaging section by using the parameter corresponding to inverse transformation of the distortion factor, and
performs a ray trace to detect a corresponding point by use of the projection section and the imaging section subjected to the distortion correction, thereby estimating the posture-related parameters.

(8)
The information processing apparatus as stated in paragraph (7) above, in which
the posture estimation section optimizes the posture-related parameters in such a manner that an average error of the detected corresponding points becomes equal to or smaller than a predetermined threshold value.

(9)
The information processing apparatus as stated in paragraph (8) above in which,
in a case where the average error does not become equal to or smaller than the threshold value, the posture estimation section corrects the parameters for use in estimation of the posture-related parameters, and
the posture estimation section repeatedly estimates the posture-related parameters until the average error becomes equal to or smaller than the threshold value.

(10)
The information processing apparatus as stated in paragraph (8) or (9) above, in which
the posture estimation section optimizes the posture-related parameters while removing as an outlier a corresponding point having a large error.

(11)
The information processing apparatus as stated in any one of paragraphs (7) to (10) above, in which
the posture estimation section
estimates the posture-related parameters of the projection section,
estimates the posture-related parameters of the imaging section, and
optimizes the estimated posture-related parameters of the projection section and the estimated posture-related parameters of the imaging section.

(12)
The information processing apparatus as stated in any one of paragraphs (2) to (11) above, further including:
a geometric correction section configured such that, by use of the posture-related parameters estimated by the posture estimation section, the geometric correction section generates vector data for geometric correction of the image projected by the projection section.

(13)
The information processing apparatus as stated in paragraph (12) above, in which
the geometric correction section
obtains the projection plane by use of the posture-related parameters of the projection section and of the imaging section so as to model the obtained projection plane as a two-dimensional curved surface, and
generates the vector data by use of the projection plane model thus obtained.

(14)

The information processing apparatus as stated in paragraph (13) above, in which, by use of the projection plane model, the geometric correction section estimates a virtual viewpoint position in front of the projection plane and a projection direction relative to the virtual viewpoint position, thereby generating the vector data for suppressing distortion of the virtual viewpoint position.

(15)

The information processing apparatus as stated in paragraph (14) above, in which the geometric correction section performs a model misalignment corresponding process for suppressing an error between an actual projection plane and the model.

(16)

The information processing apparatus as stated in paragraph (15) above, in which the geometric correction section generates a projection mask for limiting a range in which the image is to be projected.

(17)

The information processing apparatus as stated in any one of paragraphs (1) to (16) above, further including:

a corresponding point detection section configured to detect a corresponding point between the projection section and the imaging section, in which, by use of the corresponding points detected by the corresponding point detection section, the posture estimation section estimates the posture of the projection section and that of the imaging section.

(18)

The information processing apparatus as stated in any one of paragraphs (1) to (17) above, further including:

the projection section.

(19)

The information processing apparatus as stated in any one of paragraphs (1) to (18) above, further including:

the imaging section.

(20)

An information processing method including:

by use of an image projection model using a distortion factor of an fθ lens with an image height of incident light expressed by a product of a focal point distance f and an incident angle θ of the incident light, estimating a posture of a projection section for projecting an image and a posture of an imaging section for capturing a projection plane to which the image is projected.

REFERENCE SIGNS LIST

100 Projection imaging system, 111 Control apparatus, 112 Projection apparatus, 113 Imaging apparatus, 201 Control section, 251 Sensing processing section, 252 Posture estimation section, 253 Geometric correction section, 261 Imaging variable estimation section, 262 Projection variable estimation section, 263 Total optimization section, 271 Projection plane modeling section, 272 Virtual viewpoint position/projection direction estimation section, 273 Model misalignment corresponding processing section, 274 Projection mask generation section, 301 Control section, 302 Projection section, 401 Control section, 402 Imaging section, 801 Projection imaging apparatus, 811 Projection section, 812 Imaging section, 820 Imaging apparatus, 821 Control section, 830 Projection imaging apparatus

The invention claimed is:

1. An information processing apparatus, comprising:
a posture estimation section configured to estimate, based on an image projection model, a posture of a projection section for projection of an image and a posture of an imaging section to capture a projection plane to which the image is projected, wherein the image projection model is based on a distortion factor of an fθ lens with an image height of incident light expressed by a product of a focal point distance f and an incident angle θ of the incident light; and
estimate, based on the image projection model, posture-related parameters of at least one of the projection section or the imaging section, wherein
the posture-related parameters include internal parameters of the at least one of the projection section or the imaging section, and
the internal parameters include at least one of the focal point distance, a principal point, or a parameter corresponding to inverse transformation of the distortion factor regarding the at least one of the projection section or the imaging section.

2. The information processing apparatus according to claim 1, wherein the posture-related parameters include external parameters of the at least one of the projection section or the imaging section.

3. The information processing apparatus according to claim 2, wherein the external parameters include one of a rotation matrix or a translation vector with respect to an origin of a world coordinate system of one of the projection section or the imaging section.

4. The information processing apparatus according to claim 1, wherein the posture estimation section is further configured to:
perform image distortion correction on the projection section and the imaging section based on a parameter corresponding to inverse transformation of the distortion factor; and
perform a ray trace to detect a corresponding point, wherein the ray trace is performed based on image distortion correction.

5. The information processing apparatus according to claim 4, wherein the posture estimation section is further configured to optimize the posture-related parameters in such a manner that an average error of the detected corresponding point becomes equal to or smaller than a threshold value.

6. The information processing apparatus according to claim 5, wherein based on the average error that does not become equal to or smaller than the threshold value, the posture estimation section is further configured to:
correct parameters for use in estimation of the posture-related parameters; and
repeatedly estimate the posture-related parameters until the average error becomes equal to or smaller than the threshold value.

7. The information processing apparatus according to claim 5, wherein the posture estimation section is further configured to optimize the posture-related parameters while removing as an outlier a corresponding point having a large error.

8. The information processing apparatus according to claim 4, wherein the posture estimation section is further configured to:
estimate the posture-related parameters of the projection section;
estimate the posture-related parameters of the imaging section; and
optimize the estimated posture-related parameters of the projection section and the estimated posture-related parameters of the imaging section.

9. The information processing apparatus according to claim 1, further comprising:
a geometric correction section configured to generate, based on the posture-related parameters, vector data for geometric correction of the image projected by the projection section.

10. The information processing apparatus according to claim 9, wherein the geometric correction section is further configured to:
- obtain the projection plane based on the posture-related parameters of the projection section and of the imaging section to model the obtained projection plane as a two-dimensional curved surface; and
- generate the vector data based on the projection plane model.

11. The information processing apparatus according to claim 10, wherein by use of the projection plane model, the geometric correction section is further configured to:
- estimate a virtual viewpoint position in front of the projection plane and a projection direction relative to the virtual viewpoint position; and
- generate the vector data based on the virtual viewpoint position and the projection direction to suppress distortion of the virtual viewpoint position.

12. The information processing apparatus according to claim 11, wherein the geometric correction section is further configured to perform a model misalignment process to suppress an error between an actual projection plane and the plane projection model.

13. The information processing apparatus according to claim 12, wherein the geometric correction section is further configured to generate a projection mask to limit a range in which the image is to be projected.

14. The information processing apparatus according to claim 1, further comprising:
- a corresponding point detection section configured to detect a corresponding point between the projection section and the imaging section, wherein by use of the corresponding point detected by the corresponding point detection section, the posture estimation section is further configured to estimate the posture of the projection section and that of the posture of the imaging section.

15. The information processing apparatus according to claim 1, further comprising:
- the projection section.

16. The information processing apparatus according to claim 1, further comprising:
- the imaging section.

17. An information processing method, comprising:
- estimating, based on an image projection model, a posture of a projection section for projecting an image and a posture of an imaging section for capturing a projection plane to which the image is projected, wherein the image projection model is based on a distortion factor of an f$\theta$ lens with an image height of incident light expressed by a product of a focal point distance f and an incident angle $\theta$ of the incident light; and
- estimating, based on the image projection model, posture-related parameters of at least one of the projection section or the imaging section, wherein
  - the posture-related parameters include internal parameters of the at least one of the projection section or the imaging section, and
  - the internal parameters include at least one of the focal point distance, a principal point, or a parameter corresponding to inverse transformation of the distortion factor regarding the at least one of the projection section or the imaging section.

* * * * *